United States Patent
Kawai et al.

(10) Patent No.: US 8,018,867 B2
(45) Date of Patent: Sep. 13, 2011

(54) NETWORK SYSTEM FOR MONITORING OPERATION OF MONITORED NODE

(75) Inventors: Jun Kawai, Kawasaki (JP); Katsutoshi Yano, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 12/289,530

(22) Filed: Oct. 29, 2008

(65) Prior Publication Data
US 2009/0059810 A1 Mar. 5, 2009

Related U.S. Application Data

(63) Continuation of application No. PCT/JP2006/304730, filed on Mar. 10, 2006.

(51) Int. Cl.
*H04L 12/26* (2006.01)
(52) U.S. Cl. .......... 370/252; 370/217
(58) Field of Classification Search .......... 370/216–228, 370/241–253; 714/23–24
See application file for complete search history.

(56) References Cited

U.S. PATENT DOCUMENTS

| | | | |
|---|---|---|---|
| 6,594,717 B2 * | 7/2003 | Rasmussen et al. | 710/100 |
| 6,977,901 B2 * | 12/2005 | Ito et al. | 370/242 |
| 7,020,076 B1 * | 3/2006 | Alkalai et al. | 370/217 |
| 7,287,180 B1 * | 10/2007 | Chen et al. | 714/4 |
| 7,451,359 B1 * | 11/2008 | Coekaerts | 714/48 |
| 7,467,322 B2 * | 12/2008 | Baba | 714/4 |
| 2001/0034799 A1 | 10/2001 | Ito et al. | |
| 2002/0152425 A1 * | 10/2002 | Chaiken et al. | 714/23 |

FOREIGN PATENT DOCUMENTS

| | | |
|---|---|---|
| JP | 05-304528 | 11/1993 |
| JP | 2001-285318 | 10/2001 |
| JP | 2001-308951 | 11/2001 |
| JP | 2002-135262 | 5/2002 |
| JP | 2003-8579 | 1/2003 |
| JP | 2004-86367 | 3/2004 |

OTHER PUBLICATIONS

International Search Report (mailed Apr. 4, 2006 for International Application No. PCT/JP2006/304730).

* cited by examiner

*Primary Examiner* — Gary Mui
*Assistant Examiner* — Ben Liu
(74) *Attorney, Agent, or Firm* — Staas & Halsey LLP

(57) ABSTRACT

A network system includes: a monitored node (300) which is connected to a network (50) for isochronous transfer and asynchronous transfer and has a utility function; and a monitoring node (200) which monitors an operating state of the monitored node. The monitored node cyclically transmits a command (KA) representative of a normal operating state thereof to the monitoring node in one of isochronous channels on the network. When the monitoring node determines non-reception of the command representative of the normal operating state from the monitored node, the monitoring node transmits, to the monitored node, a real-time command to execute abnormality response processing such as resetting, power shut-off or disconnection from the network.

18 Claims, 25 Drawing Sheets

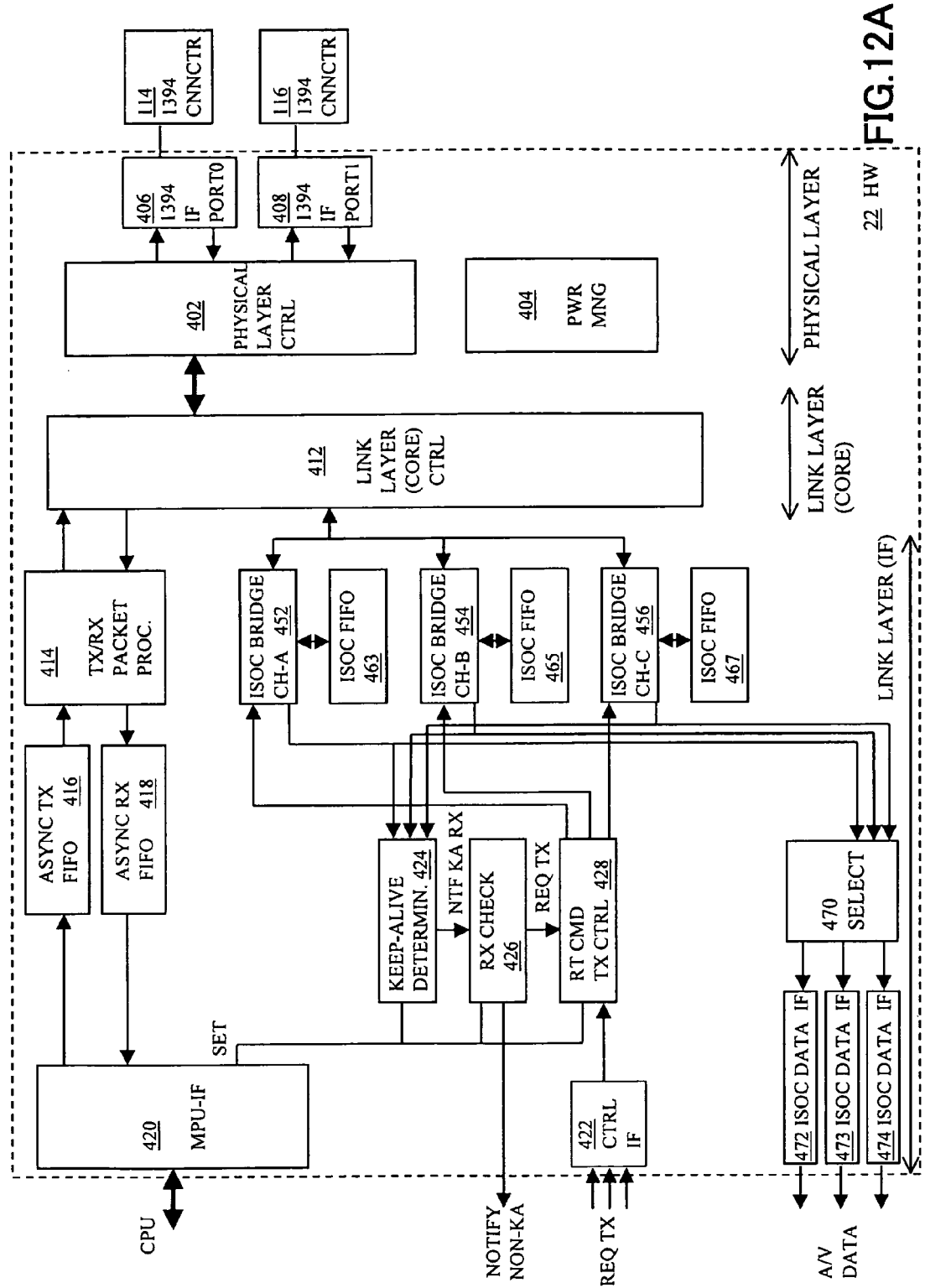

NETWORK SYSTEM FOR MONITORING OPERATION OF MONITORED NODE

This application is a continuation application of international application PCT/JP2006/304730 filed Mar. 10, 2006.

FIELD OF THE INVENTION

The present invention generally relates to monitoring of an operating state of a node in a network system, and more particularly, to a network system in which one node monitors the operating state of another node and controls the other node over a network in compliance with the IEEE 1394 standard.

BACKGROUND OF THE INVENTION

A network in compliance with the IEEE 1394 standard provides asynchronous communication of a best effort type, and isochronous communication which ensures a transmission bandwidth and a cyclic transfer. However, a network system in compliance with the IEEE 1394 standard is not configured so as to monitor the operating states of the nodes on the IEEE 1394 compliant network.

Japanese Patent Application Publication No. 2001-308951-A describes a packet transmission and reception processing unit that is suitable for an asynchronous connection. In the packet transmission and reception processing unit, if a packet processing controller circuit on a consumer's side has failed to process a received packet within a predetermined period of time, a packet processing control timer detects a time-out and informs a CPU of the time-out. In response, the CPU issues packet processing suspend instruction and packet transmit instruction for the controller circuit via a register. The controller circuit suspends the current packet processing and produces header and data for a write response (WRS) packet, which is transmitted to a producer node via a bus. In this manner, a packet can be processed without causing a time-out at the producer node.

Japanese Patent Application Publication No. 2002-135262-A describes a network monitoring system. In the network monitoring system, a control means updates the value of a time information area in a corresponding MAC address of a table for each arrival of a packet. Upon reception of a monitoring command for a network interface card (NIC), the control means refers to the time information area of the table, without conducting packet transfer to the NIC. When a difference between the value of the time information area and current time is within a predetermined time, the control means in response informs a monitoring device of the normal operation of the NIC. When the difference exceeds the predetermined time, the control means informs the device of the occurrence of abnormality in the NIC or a line to the NIC.

Japanese Patent Application Publication No. 2003-8579-A describes a cyclic data communication system. In the cyclic data communication system, a communication node assigned to a management station periodically transmits a cyclic trigger packet indicative of the start of a communication cycle in the isochronous communication phase. In response to the cyclic trigger packet sent from the communication node assigned to the management station in the asynchronous communication phase, a communication node assigned to an ordinary station, in the asynchronous communication phase, transmits object data by making a transmission request to obtain a transmission opportunity.

Japanese Patent Application Publication No. 2004-86367-A describes an apparatus for diagnosing plant network integrity. Controllers and an operator console are connected like a star through a repeater. The apparatus for diagnosing plant network integrity is configured to directly connect a data collection means to the repeater, and directly connect a check means to a data collection means. The data collection means receives and collects all the frames transmitted to a plant network. A fixed cyclic data check means of the check means checks a frame by comparing a frame transmitted in a fixed cycle with pre-recorded frame reference information. Thus the abnormality of the controller is determined.

DISCLOSURE OF THE INVENTION

On the network in compliance with the IEEE 1394 standard, in order for a particular node to detect abnormality occurring in the host CPU or the like of another node, the particular node is required to transmit an asynchronous command to the other node and to analyze and determine the presence or absence of an asynchronous response to the command and the content of the response. However, the asynchronous communication on the IEEE 1394 compliant network involves a transfer time delay that varies depending on the traffic on the bus, and a processing time delay that varies depending on the processing load and the operating state of software for required transmission and reception processing. Thus, the particular node may not monitor the operating state of the other node in the short cycle to be ensured, and may provide a relatively long delay for determining the detected operating state of the other node. Thus, it involves an undesirably long time to detect when an abnormality occurs in the node. If such a system is applied, for example, to a vehicle safety system that activates a brake in an emergency, a slight time delay in communication and processing may lead to serious consequences for safety.

The inventors have recognized that the time delay in detection of the operating states of the nodes can be significantly reduced by monitoring the information representative of the operating states of the nodes, which information is isochronously transferred in cycles on the IEEE 1394 compliant network.

An object of the present invention is to reduce a time delay in monitoring an operating state of a node in a network system.

Another object of the present invention is to prevent a malfunction of one node caused by an operation abnormality of another node in a network system.

SUMMARY OF THE INVENTION

In accordance with an aspect of the present invention, a network system includes: a monitored node which is connected to a network for isochronous transfer and asynchronous transfer and has a utility function; and a monitoring node which monitors an operating state of the monitored node. The monitored node cyclically transmits a command representative of a normal operating state thereof to the monitoring node in one of isochronous channels on the network. When the monitoring node determines non-reception of the command representative of the normal operating state from the monitored node, the monitoring node transmits, to the monitored node, a real-time command to execute abnormality response processing, such as resetting, power shut-off or disconnection from the network.

In accordance with another aspect of the present invention, a network system includes: a plurality of monitored nodes which are connected to a network for isochronous transfer and asynchronous transfer; and a monitoring node which monitors operating states of the plurality of respective monitored nodes. Each of the plurality of monitored nodes cyclically transmits a command representative of a normal operating state of that monitored node to the monitoring node in one of isochronous channels on the network. When the monitoring node determines non-reception of the command representative of the normal operating state from one of the plurality of monitored nodes, the monitoring node transmits, to the one monitored node, a real-time command to execute abnormality response processing such as resetting, power shut-off or disconnection from the network, in one of the isochronous channels.

According to the invention, a time delay in monitoring an operating state of a node can be reduced in a network system, and a malfunction of one node caused by an operation abnormality of another node can be prevented in a network system.

BRIEF DESCRIPTION OF THE DRAWINGS

FIG. 12A shows another exemplary arrangement for LSI implementation of the hardware of the monitoring node, in accordance with the embodiment of the invention;

DESCRIPTION OF THE PREFERRED EMBODIMENTS

The invention will be described with reference to the accompanying drawings. Throughout the drawings, similar symbols and numerals indicate similar items and functions.

Figure 1:
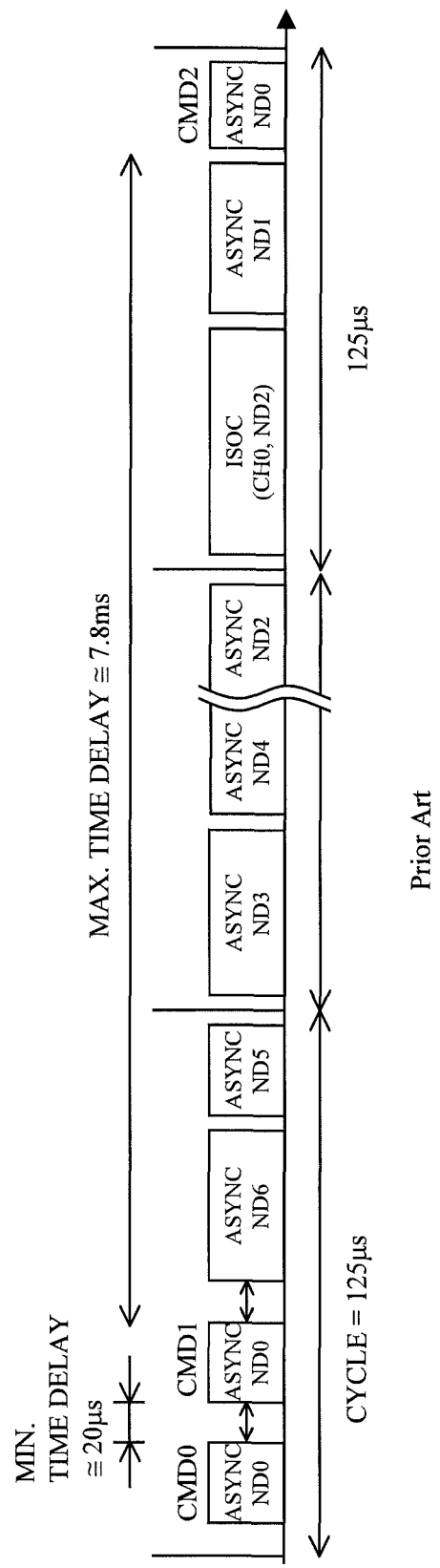
FIG. 1 shows an example of a time chart of the shortest and longest intervals in transmission of normal asynchronous commands from one node to other nodes, over a network in compliance with the IEEE 1394 standard.

FIG. 1 shows an example of a time chart of the shortest and longest intervals in transmission of normal asynchronous commands CMD0, CMD1 and CMD2 from one node ND0 to other nodes, over a network in compliance with the IEEE 1394 standard.

In FIG. 1, when only the node ND0 transmits the successive asynchronous commands CMD0 and CMD1 on the IEEE 1394 compliant network and no other transmission occurs on the network, the time delay of the transmission is equal to the time interval between the end of the transmission of the command CMD0 and the start of the transmission of the next command CMD1, i.e., the arbitration reset gap. The initial value of the time delay may be approximately 20 µs. On the other hand, when asynchronous and isochronous data transfers from many other nodes ND1 to ND7 occur immediately after the transmission of the command CMD1, the maximum value of the time delay is "the number of nodes requesting transfer simultaneously" divided by (÷) "the number, per cycle, of nodes that can perform asynchronous transfer multiplied by (×) the cycle length", which equals (=) 63 (the maximum number of nodes that can connect with the network)" divided by (÷) 1 (for transfer of an asynchronous packet of a maximum size that can be transferred in a time remaining within one cycle after an isochronous transfer in the one cycle) multiplied by (×) 125 μs, which approximately equals (≈) 7.8 ms.

Figure 2A:
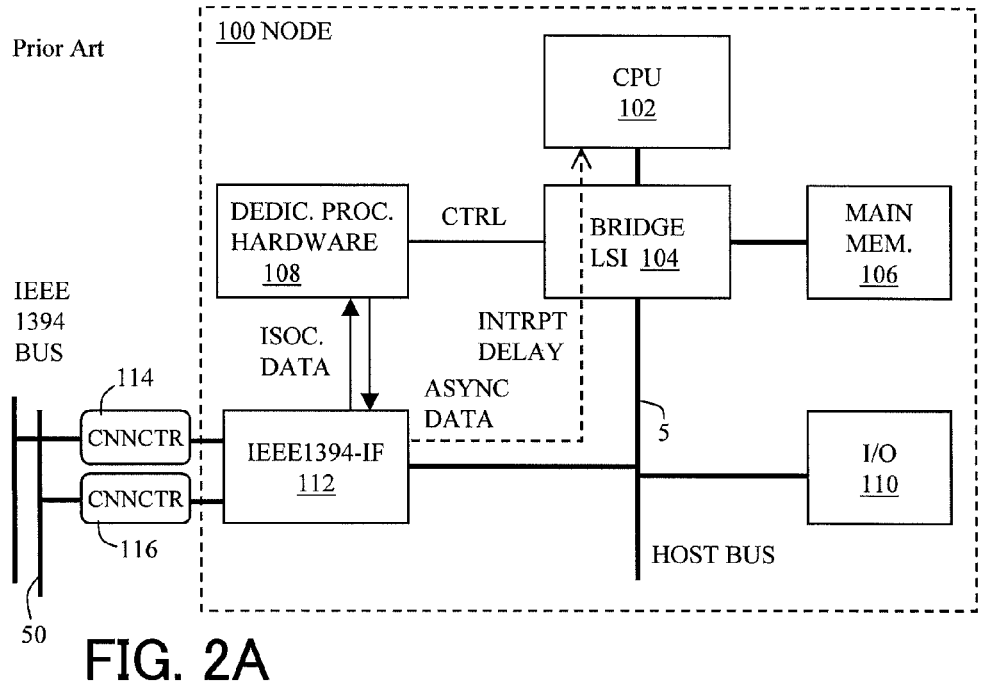
FIG. 2A shows an exemplary hardware configuration of a node in a block form on the IEEE 1394 network.
Figure 2B:
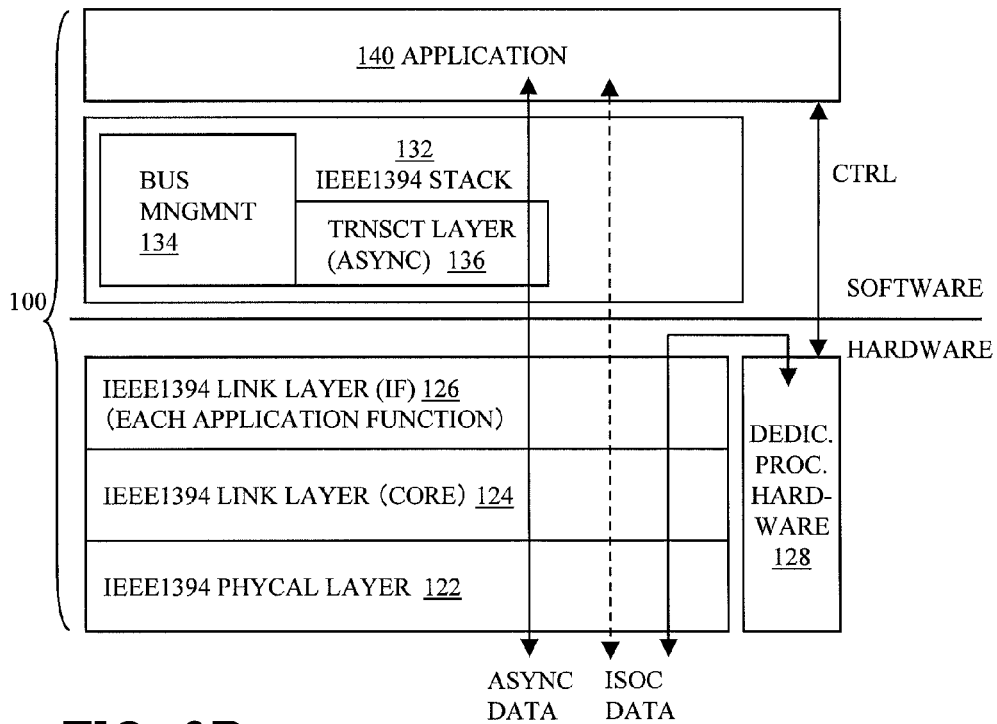
FIG. 2B shows a hierarchy of the hardware and software of the node on the IEEE 1394 network.

FIG. 2A shows an exemplary hardware configuration of a node 100 in a block form on the IEEE 1394 network. FIG. 2B shows the hierarchy of the hardware and software of the node 100 on the IEEE 1394 network.

In FIG. 2A, the node 100 has a CPU 102, a bridge LSI 104 connected to the CPU 102, a main memory 106 connected to the bridge LSI 104, an IEEE 1394 physical and link layer interface (IF) 112 connected to the bus as an IEEE 1394 compliant network 50 via connectors 114 and 116, dedicated processing hardware 108 connected between the interface 112 and the bridge LSI 104, and an input and output (I/O) section 110 connected to the interface 112 and the bridge LSI 104 via a host bus 5.

In FIG. 2B, the node 100 has as hardware, an IEEE 1394 physical layer 122, an IEEE 1394 link (core) layer 124, an IEEE 1394 link (IF) layer 126 for each application function, and dedicated processing hardware 128 for isochronous data as a physical layer and a link layer. The node 100 also has as software, an IEEE 1394 stack 132 including a bus management 134 and a transaction layer 136, and an application 140 for a utility function.

Upon receipt of asynchronous data, the interface 112 interrupts the CPU 102 for the reception processing. It takes one (1) ms or longer normally for processing to accept the interrupt. Asynchronous data is processed at the physical layer 122, the link layer (core) 124, the link layer (IF) 126, the transaction layer 136, and the application layer 140. On the other hand, isochronous data is processed at the physical layer 122, the link layer (core) 124, the link layer (IF) 126, and the dedicated processing hardware 128, without requirement of an interrupt to the CPU 102 and hence without any time delay due to the software processing. The dedicated processing hardware 128 is controlled by the application 140. However, isochronous data may be processed by software, as indicated by a dashed line with arrows.

Figure 3A:
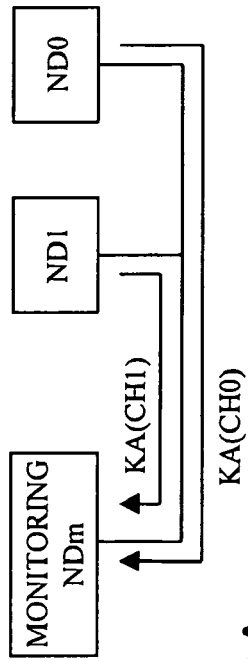
FIG. 3A shows a network system including a node for monitoring and nodes to be monitored, in accordance with the principle of the present invention.
Figure 3B:
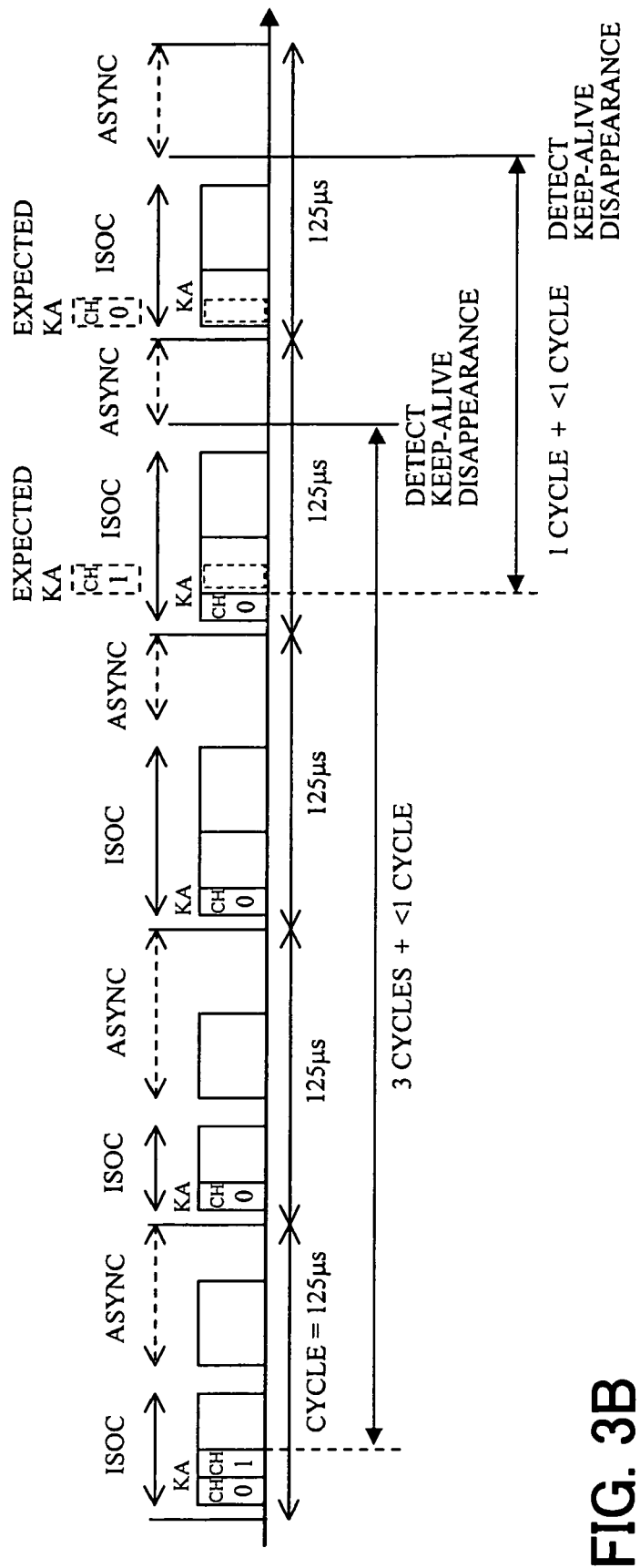
FIG. 3B shows an example of the isochronous transfer of a keep-alive command (KA) sent from the monitored nodes to the monitoring node, in accordance with the principle of the invention.

FIG. 3A shows a network system including a node for monitoring, NDm, and nodes to be monitored, ND0 and ND1, in accordance with the principle of the present invention. FIG. 3B shows an example of the isochronous transfer of a keep-alive command (KA) sent from the monitored nodes ND0 and ND1 to the monitoring node NDm, in accordance with the principle of the invention.

The monitored node ND0 transmits a keep-alive command KA to the monitoring node NDm in the time period of a reserved isochronous transfer channel CH0 in each cycle. The monitored node ND1 transmits the keep-alive command KA to the monitoring node NDm in the time period of a reserved isochronous transfer channel CH1 in one of every three cycles. Consequently, when the monitoring node NDm does not detect the keep-alive command KA in the isochronous transfer channel CH0, an abnormality of the operating state of the monitored node ND0 is detected in a short period of time, such as one cycle plus less than one cycle, after the occurrence of the abnormality, independently of the asynchronous data traffic on the network. When the monitoring node NDm does not detect the keep-alive command KA in the isochronous transfer channel CH1, an abnormality of the operating state of the monitored node ND1 is detected in a short period of time, such as three cycles plus less than one cycle, after the occurrence of the abnormality, independently of the asynchronous data traffic on the network.

Figure 4A:
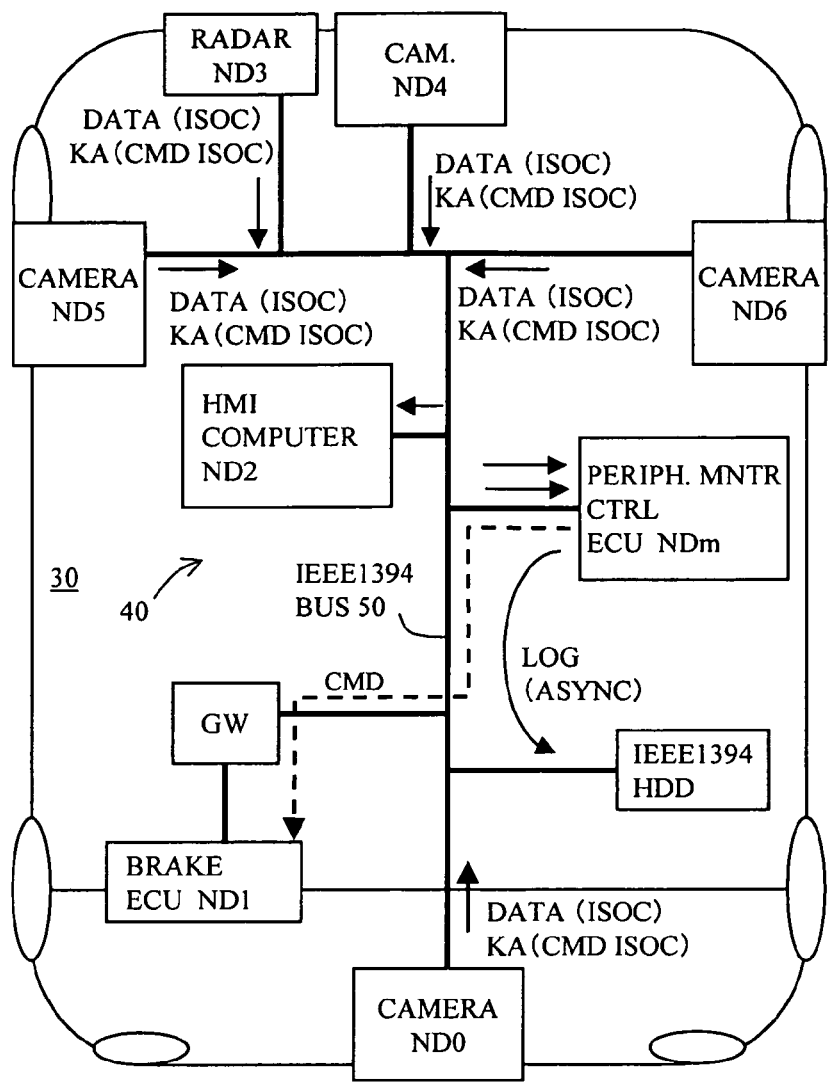
FIGS. 4A and 4B show an operation of a peripheral monitoring and control node, when the operating state of the monitored node is normal in a safety system of a vehicle, to which the principle of the invention is applied.
Figure 4B:
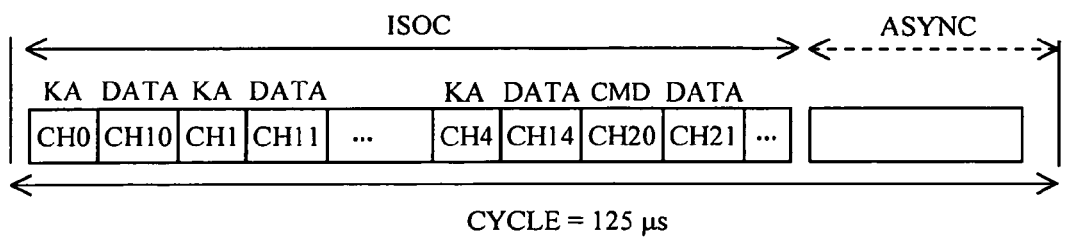

FIGS. 4A and 4B show an operation of a peripheral monitoring and control node NDm when the operating state of the monitored node ND0 is normal in a safety system 40 of a vehicle 30, to which the principle of the invention is applied.

The safety system 40 includes: a peripheral monitoring and control ECU (electronic control unit) as the node NDm; camera nodes ND0, ND4, ND5 and ND6, a radar node ND3, and a brake ECU node ND1, as the peripherals; an HMI (human-machine interface) computer ND2 as a network node; and an IEEE 1394 compliant hard disk HDD. All of these elements are connected to the bus as the IEEE 1394 network 50. The peripheral monitoring and control ECU node NDm has a function of monitoring and controlling the peripheral devices having respective utility functions as network nodes, and has a function of monitoring the operating states of the other network nodes.

Referring to FIGS. 4A and 4B, when the safety system 40 operates in a normal state, the peripheral monitoring and control ECU node NDm receives isochronous keep-alive commands (CMD) KA from the nodes ND0 and ND3-ND6 in a plurality of isochronous channels CH0, CH1, . . . , and CH4 of respective cycles, and receives isochronous data in the plurality of isochronous channels. When the peripheral monitoring and control ECU node NDm receives the keep-alive commands KA normally and recognizes a danger to the vehicle 30 and the driver in accordance with the received isochronous data, for example, when the node NDm recognizes, while the vehicle is stopping, a danger of another vehicle behind colliding with the vehicle in accordance with the image data from the camera node ND4, the peripheral monitoring and control ECU node NDm transmits an isochronous real-time command CMD to activate the brake to the brake ECU node ND1 via a gateway GW in an isochronous channel in the same or subsequent cycle. This may prevent the driver from suffering a whiplash injury due to a collision of the vehicle with another vehicle.

Figure 5A:
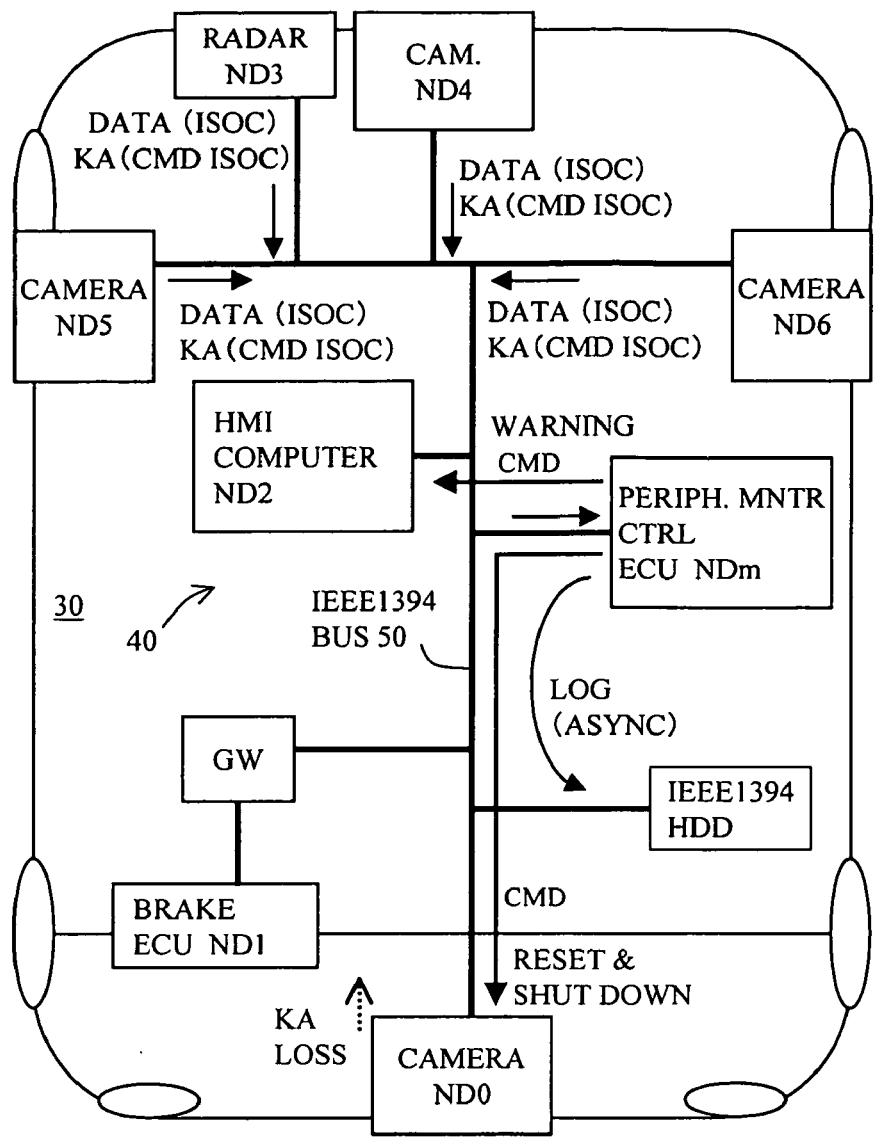
FIGS. 5A and 5B show an operation of the peripheral monitoring and control node in an abnormal operating state of the monitored and controlled node in the safety system of FIG. 4A.
Figure 5B:
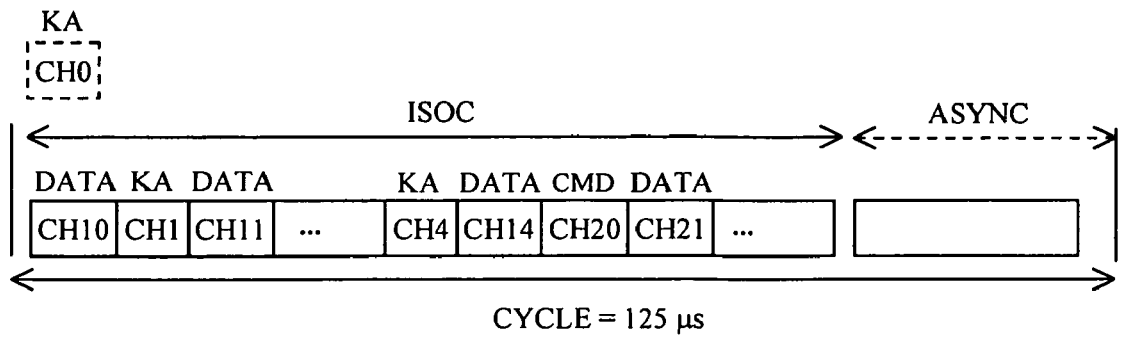

FIGS. 5A and 5B show an operation of the peripheral monitoring and control ECU node NDm in an abnormal operating state of the monitored and controlled node ND0 in the safety system 40 of FIG. 4A.

Referring to FIGS. 5A and 5B, it is assumed that, in the safely system 40, the peripheral monitoring and control ECU node NDm detects non-reception or disappearance of the isochronous keep-alive command KA (CMD) from the camera node ND0 at a particular time and thereafter. In response to the non-reception or disappearance of the command, the peripheral monitoring and control ECU node NDm transmits an isochronous real-time command CMD to execute abnormality or emergency response processing such as operation resetting or power shut-off, to the camera node ND0 in an isochronous channel in the subsequent cycle. Then, if necessary, the peripheral monitoring and control ECU node NDm transmits a real-time command CMD for a warning indicative of a failure of the camera node ND0, to the HMI computer node ND2.

In response to the real-time command CMD to execute the abnormality response processing, the camera node ND0, for example, resets its own function or shuts off the power supply to the camera function to disable the transmission of image data. This prevents the peripheral monitoring and control ECU node NDm from erroneously recognizing the received data due to the failure of the camera node ND0 and from performing an incorrect response operation due to the erroneous recognition. In response to the isochronous real-time command CMD for the camera node ND0 to execute the abnormality response processing or the real-time command CMD for providing a warning, the HMI computer node ND2 indicates the warning on the display via the I/O (110 in FIG. 2A), and produces a warning sound through a speaker. Thus, the driver is notified of the occurrence of the failure in the operation of the camera node ND0.

Figure 6A:
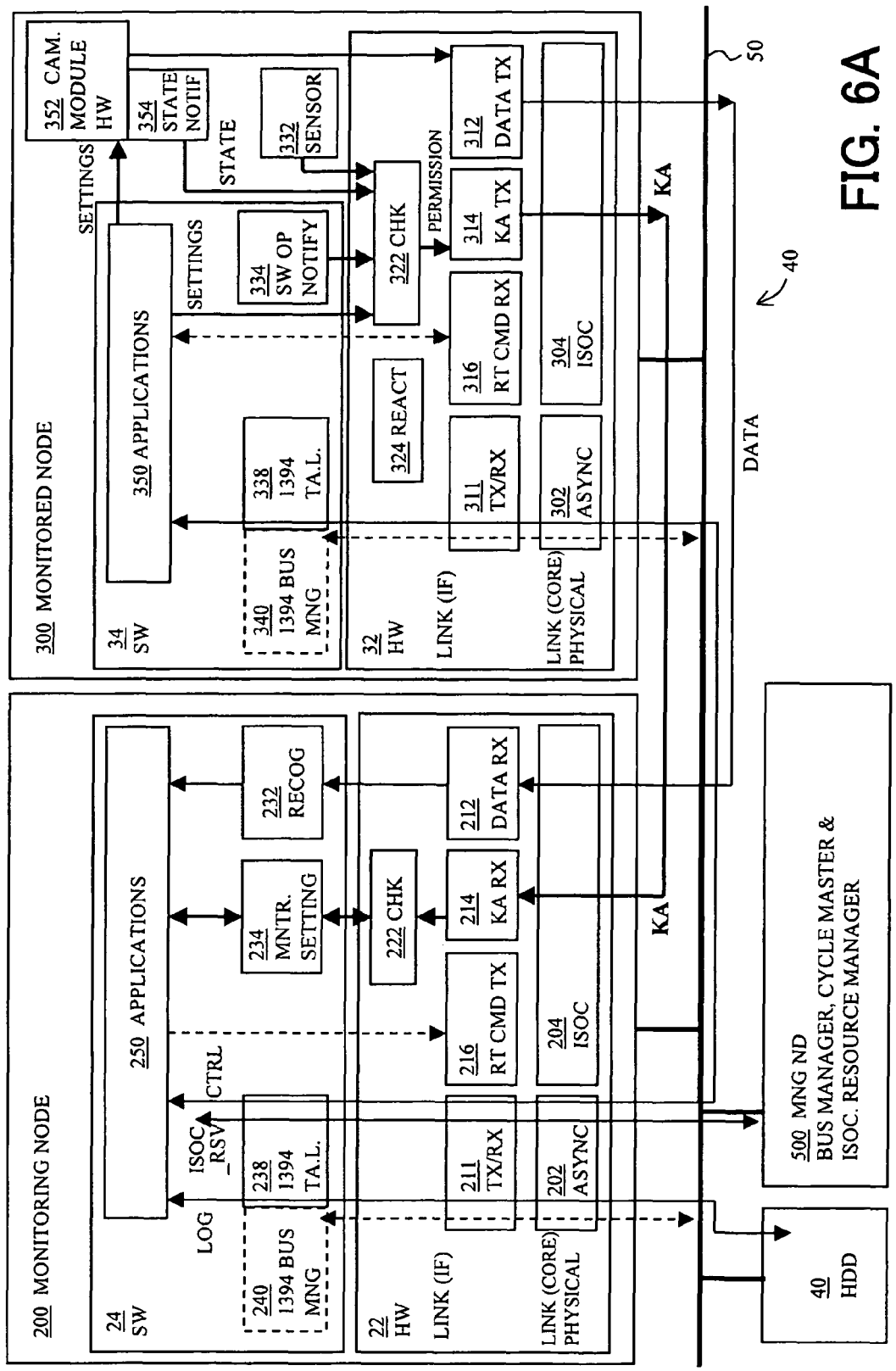
FIG. 6A shows schematic configurations of a node for monitoring and a node to be monitored which are connected to the IEEE 1394 network, and an operation of the monitoring node when the monitored node is in a normal state, in accordance with the embodiment of the invention.
Figure 6B:
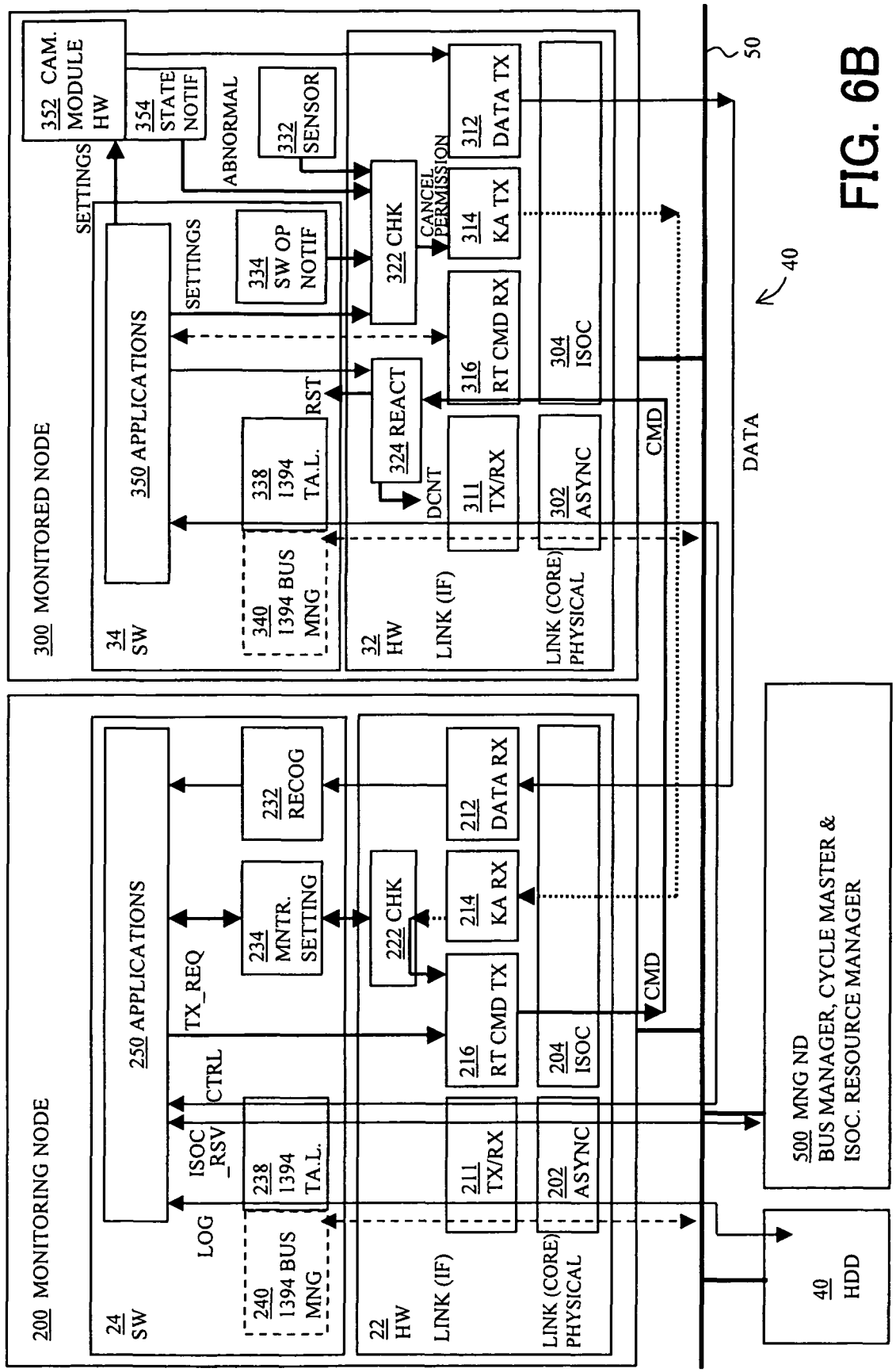
FIG. 6B shows the schematic configurations of the monitoring node and the monitored node which are connected to the IEEE 1394 network, and the operation of the monitored node when the monitored node is in a state of producing no keep-alive command, in accordance with the embodiment of the invention.

FIG. 6A shows schematic configurations of a node for monitoring 200 and a node to be monitored 300 which are connected to the IEEE 1394 network 50, and an operation of the monitoring node 200 when the monitored node 300 is in a normal state, in accordance with the embodiment of the invention. FIG. 6B shows the schematic configurations of the monitoring node 200 and the monitored node 300 which are connected to the IEEE 1394 network 50, and the operation of the monitored node 200 when the monitored node 300 is in a state of producing no keep-alive command or message or losing a keep-alive command, in accordance with the embodiment of the invention.

The function of the monitoring node 200 may be assigned to any node which has a given utility function. For example, the function of network node monitoring may be assigned to the node NDm of FIGS. 4A and 5A which has the function of monitoring and controlling peripherals. The monitored node 300 is a node which has a given utility function to be monitored and controlled. In this case, the monitored node 300 is the camera node ND0 of FIGS. 4A and 5A. In addition, a hard disk drive (HDD) node 400, and a manager node 500 are connected to the network 50. The manager node 500 has the functions of a bus manager, a cycle master and an isochronous resource manager for the IEEE 1394 network 50. The functions of the bus manager, the cycle master and the isochronous resource manager may be distributed and assigned to different nodes.

The monitoring node 200 includes an asynchronous control unit 202 and an isochronous control unit 204 in the physical layer and the link layer (core), as a part of IEEE 1394 compliant hardware (HW) 22. The monitoring node 200 also includes an asynchronous transmitter and receiver unit 211, a real-time command (RT CMD) transmitter unit 216, a Keep-Alive (KA) receiver unit 214, a data receiver unit 212, and a reception check unit (CHK) 222, in the link layer (IF) for each application, as another part of the IEEE 1394 hardware (HW) 22. The data receiver unit 212 receives the isochronous data from the utility function.

The monitoring node 200 further includes a bus manager (BUS MNG) 240, a transaction layer (TA. L.) control unit 238, and a monitoring setting unit 234 for setting the conditions for node monitoring, as a part of IEEE 1394 compliant software (SW) 24. The monitoring node 200 further includes a recognition unit 232 as a utility function of the monitoring node 200, as another part of the IEEE 1394 software (SW) 24. The recognition unit 232 recognizes received isochronous data, such as image data and radar data. The monitoring node 200 further includes application(s) 250 of the network node monitoring function and a utility function, as a further part of the IEEE 1394 software (SW) 24. The network node monitoring function may be also used for monitoring and controlling peripherals, and may include a function for preventing vehicle collision.

The monitored node 300 includes an asynchronous control unit 302 and an isochronous control unit 304 in the physical layer and the link layer (core), as a part of IEEE 1394 compliant hardware 32. The monitored node 300 also includes an asynchronous transmitter and receiver unit 311, a real-time command (RT CMD) receiver unit 316, a Keep-Alive (KA) transmitter unit 314, a data transmitter unit 312, an operating-state check unit (CHK) 322, and a reaction unit 324, in the link layer (IF) for the application, as another part of the IEEE 1394 hardware 32. The data transmitter unit 312 transmits the isochronous data of the utility function. The operating-state check unit (CHK) 322 checks the operating state of the utility function of the monitored node 300. The reaction unit 324 reacts or responds to abnormality or emergency, in response to the isochronous real-time control command from the monitoring node 200.

The monitored node 300 further includes a bus manager (BUS MNG) 340 and a transaction layer (TA. L.) control unit 338, as a part of IEEE 1394 compliant software 34. The monitored node 300 also includes application(s) 350 for a utility function such as a camera control application and for a function of generating a node keep-alive indication. For detecting the operating state of the utility function, the monitored node 300 further includes, for example, an abnormal temperature sensor 332, a software operation notification unit 334, and a state notification unit 354, as another part of the IEEE 1394 software 34. The abnormal temperature sensor 332 detects an abnormal temperature of the camera. The software operation notification unit 334 periodically provides a notification of the operating state of the software. The state notification unit 354 generates information representative of the operating state of a camera module (hardware) 352.

In the monitoring node 200, the application 250 sets, to the monitoring setting unit 234, the conditions for monitoring the operating state of the utility function of the monitored node 300. In the monitored node 300, the application 350 sets, to the operating-state check unit 322, the conditions for checking the operating state of the utility function of the monitored node 300.

The application 250 of the monitoring node 200 stores the log in the hard disk drive 400, and requests the manager node 500 to make a reservation ISOC_RSV for isochronous data transfer in the bus channel on the network 50. In this case, the isochronous data transfer includes the transfer of the keep-alive command KA from the monitored node 300 to the monitoring node 200, the transfer of the real-time (RT) command for reaction to abnormality from the monitoring node 200 to the monitored node 300, the transfer of isochronous data for utility functions such as image data between nodes, and the transfer of the real-time (RT) command for controlling utility functions between the nodes.

In operation, the camera module 352 in the monitored node 300 captures image data and provides it to the data transmitter unit 312, under the control of the application 350. The data transmitter unit 312 transmits the image data to the monitoring node 200 in the reserved predetermined isochronous channel on the network 50. The application 250 in the monitoring node 200 transmits a utility function control signal CTRL to the application 350 of the monitored node 300 in the asynchronous transfer channel on the network 50. The application 350 in the monitored node 300 controls the utility function in accordance with the received real-time command.

The data receiver unit 212 in the monitoring node 200 receives isochronous data for a utility function from the monitored node 300 in the reserved predetermined isochronous transfer channel on the network 50. The data receiver unit 212 provides the received isochronous data to the recognition unit 232. The recognition unit 232 recognizes the received isochronous data, and provides the resultant recognition to the application 250. The application 250 performs required processing and control in accordance with the resultant recognition.

In the normal operating state of the monitored node 300, the operating-state check unit 322 in the monitored node 300 receives a detected value from the abnormal temperature sensor 332, an operating state value from the software operation notification unit 334, and a state value from the state notification unit 354, and determines the relevancy of these values. If it is determined that the values are normal, the operating-state check unit 322 provides, to the Keep-Alive transmitter unit 314, an instruction to permit or enable the keep-alive transmission. In response to the permission, the Keep-Alive transmitter unit 314 transmits a keep-alive command or message to the monitoring node 200 in the reserved predetermined isochronous channel on the network 50.

The Keep-Alive receiver unit 214 in the monitoring node 200 receives the keep-alive command from the monitored node 300 in the reserved predetermined isochronous channel on the network 50. The reception check unit 222 determines whether the keep-alive command has been received by the Keep-Alive receiver unit 214 or not. When it is determined that the keep-alive command has been normally received, The reception check unit 222 notifies the monitoring setting unit 234 that the keep-alive command has been normally received.

Referring to FIG. 6B, it is assumed that an abnormality occurs in the utility function in the monitored node 300, for the purpose of explanation. When it is determined that any of the detected value from the abnormal temperature sensor 332, the operating state value from the software operation notification unit 334, and the operating state value from the camera module 352 is abnormal, for example, when it is determined that the operating state value from the software operation notification unit 334 is abnormal because of the occurrence of a software hang-up, the operating-state check unit 322 in the monitored node 300 provides, to the Keep-Alive transmitter unit 314, an instruction to cancel permission of the keep-alive transmission or disable the keep-alive transmission. In response to the cancellation of the permission, the Keep-Alive transmitter unit 314 deactivates the transmission of the keep-alive command (KA).

Consequently, from that time on, the Keep-Alive receiver unit 214 in the monitoring node 200 receives no keep-alive command (KA) from the monitored node 300 in the reserved predetermined isochronous channel on the network 50. The reception check unit 222 determines or detects non-reception of the keep-alive command from the monitored node 300, in the Keep-Alive receiver unit 214.

In response to the non-reception or disappearance of the keep-alive command, the reception check unit 222 requests the real-time command transmitter unit 216 to transmit the command for response or reaction to the abnormality of the monitored node 300, and notifies the application 250 that the keep-alive command has not been received by the monitoring setting unit 234. The real-time command transmitter unit 216 transmits, to the monitored node 300, an isochronous real-time command for a way of response or reaction to the abnormality, such as resetting or power shut-off. The application 250 requests the real-time command transmitter unit 216 to transmit a command for warning of a failure of the monitored node 300. The real-time command transmitter unit 216 transmits, to another HMI computer node (ND2 in FIG. 5A), an isochronous real-time command for warning of the failure of the monitored node 300.

The real-time command receiver unit 316 in the monitored node 300 receives the isochronous real-time command for the reaction in the reserved predetermined isochronous channel on the network 50. The reaction unit 324 receives the reaction command from the real-time command receiver unit 316, and then in accordance with the command, for example, resets the utility function of the monitored node 300 and shuts off the power supply of the monitored node 300 or disconnects the monitored node 300 from the network 50. The real-time command receiver unit 316 may notify the application 350 of the reception of the reaction command. When the monitored node 300 returns to the normal state, the application 350 resets the operation of the reaction unit 324, and restarts the monitored node 300 and the operation of the utility function thereof.

In addition, the utility function of the monitoring node 200, such as the recognition function, may be monitored by another node having the node monitoring function, i.e., the node 200 for monitoring may be also a node to be monitored by another node.

Figure 7A:
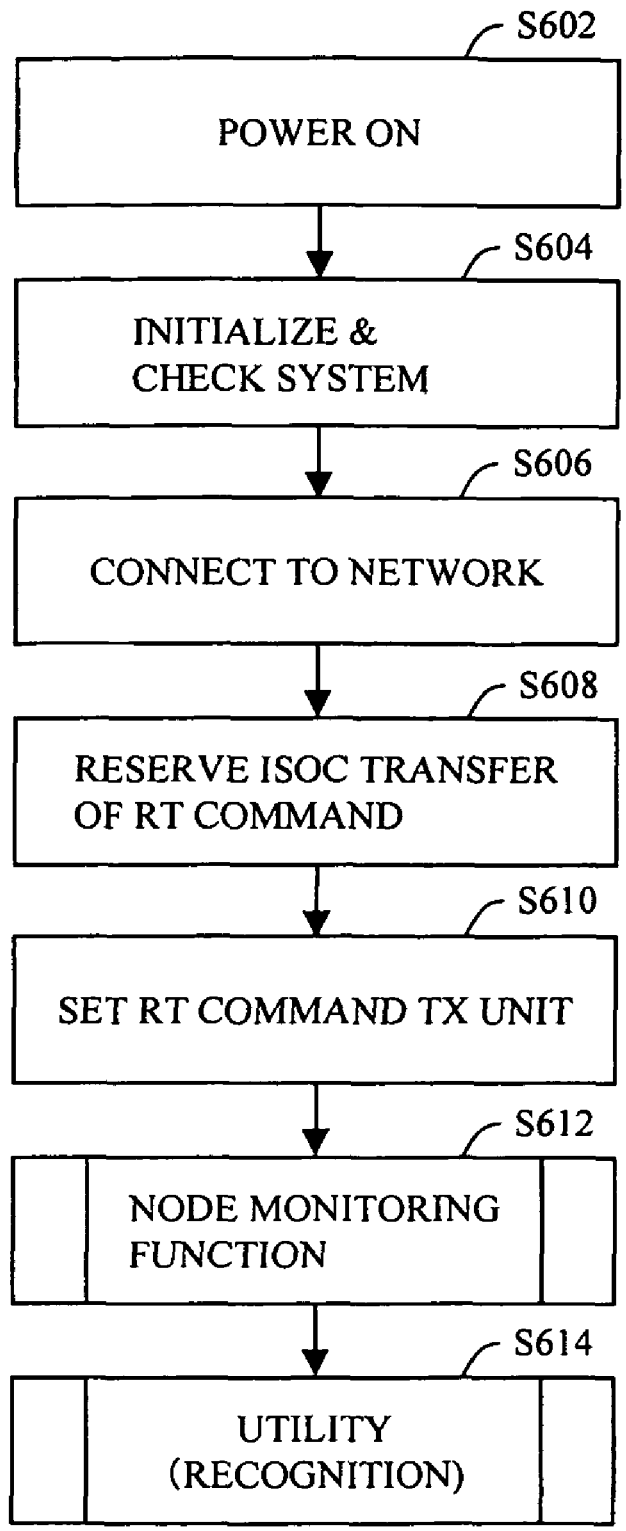
FIG. 7A shows a schematic flow chart for processing the received data from the monitored node and for monitoring the operating state of the monitored node, which is executed by the monitoring node.

FIG. 7A shows a schematic flow chart for processing the received data from the monitored node 300 and for monitoring the operating state of the monitored node 300, which is executed by the monitoring node 200.

Referring to FIGS. 6A and 7A, at Step 602, the power supply of the safety system 40 of FIG. 4A is turned on by, for example, the activation of the engine of the vehicle 30, so that the power supply of the monitoring node 200 is turned on. At Step 604, the monitoring node 200 initializes the operation of the monitoring node 200, and checks the state of the system of the monitoring node 200.

At Step 606, the application 250 connects the IEEE 1394 hardware 22 of the monitoring node 200 to the network 50. At Step 608, the application 250 transmits, to the manager node 500, an asynchronous command to reserve the isochronous transfer of a real-time (RT) command in a cycle on the network 50.

The procedure of making a reservation for the isochronous transfer includes: (1) transmitting an asynchronous command to inquire the reservable remaining band of the isochronous channel, i.e., the reservable remaining time period in the cycle, and the current reservation states of the isochronous channel numbers, to the isochronous resource manager (500); (2) selecting one of the available channels to be used; and (3) transmitting an asynchronous command to register the reservation for the channel number to be used and the channel band or time period to be used, to the isochronous resource manager (500).

At Step 610, the application 250 sets the operating conditions of the real-time command transmitter unit 216 for the reserved channel in accordance with the registered reservation. At Step 612, the application 250 activates the node monitoring function, i.e., the monitoring setting unit 214, the reception check unit 222 and the Keep-Alive receiver unit 234. At Step 614, the application 250 activates a utility function, such as the recognition function of the recognition unit 232.

Figure 7B:
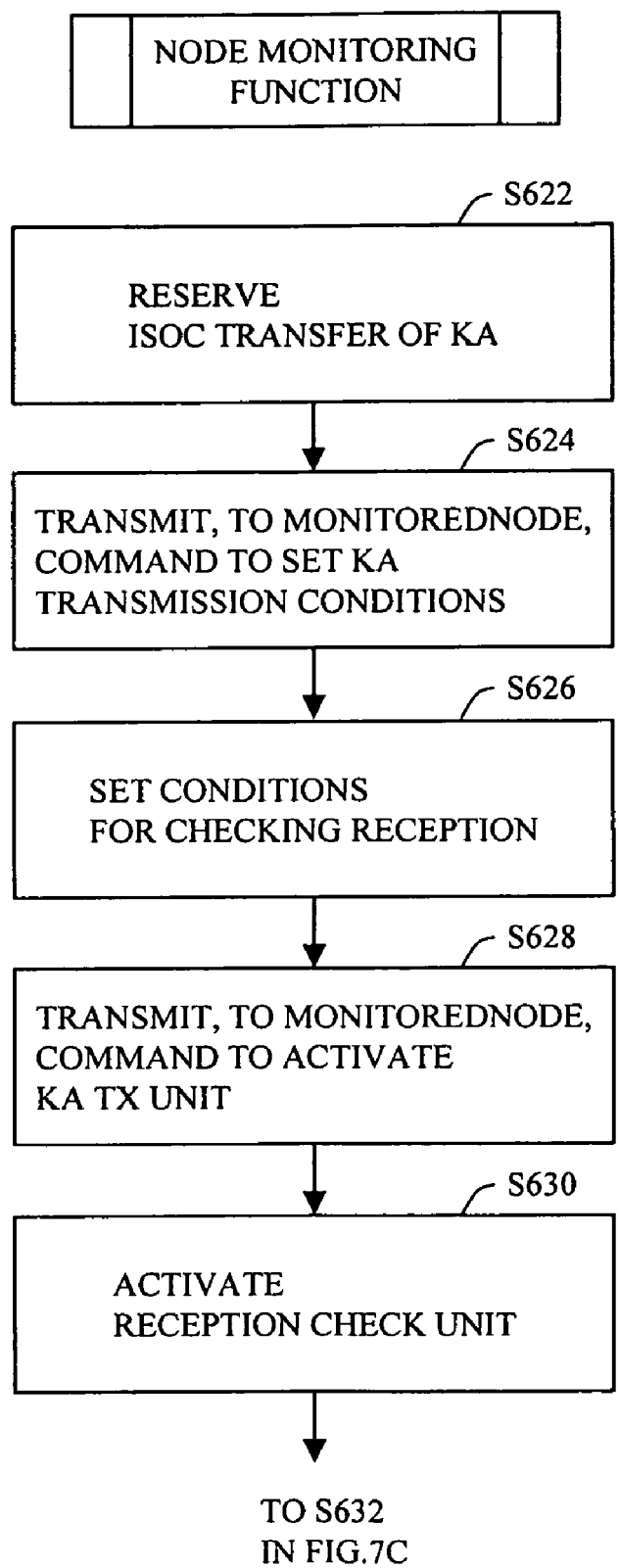
FIGS. 7B-7D show a detailed flow chart of the node monitoring function of the monitoring node.
Figure 7C:
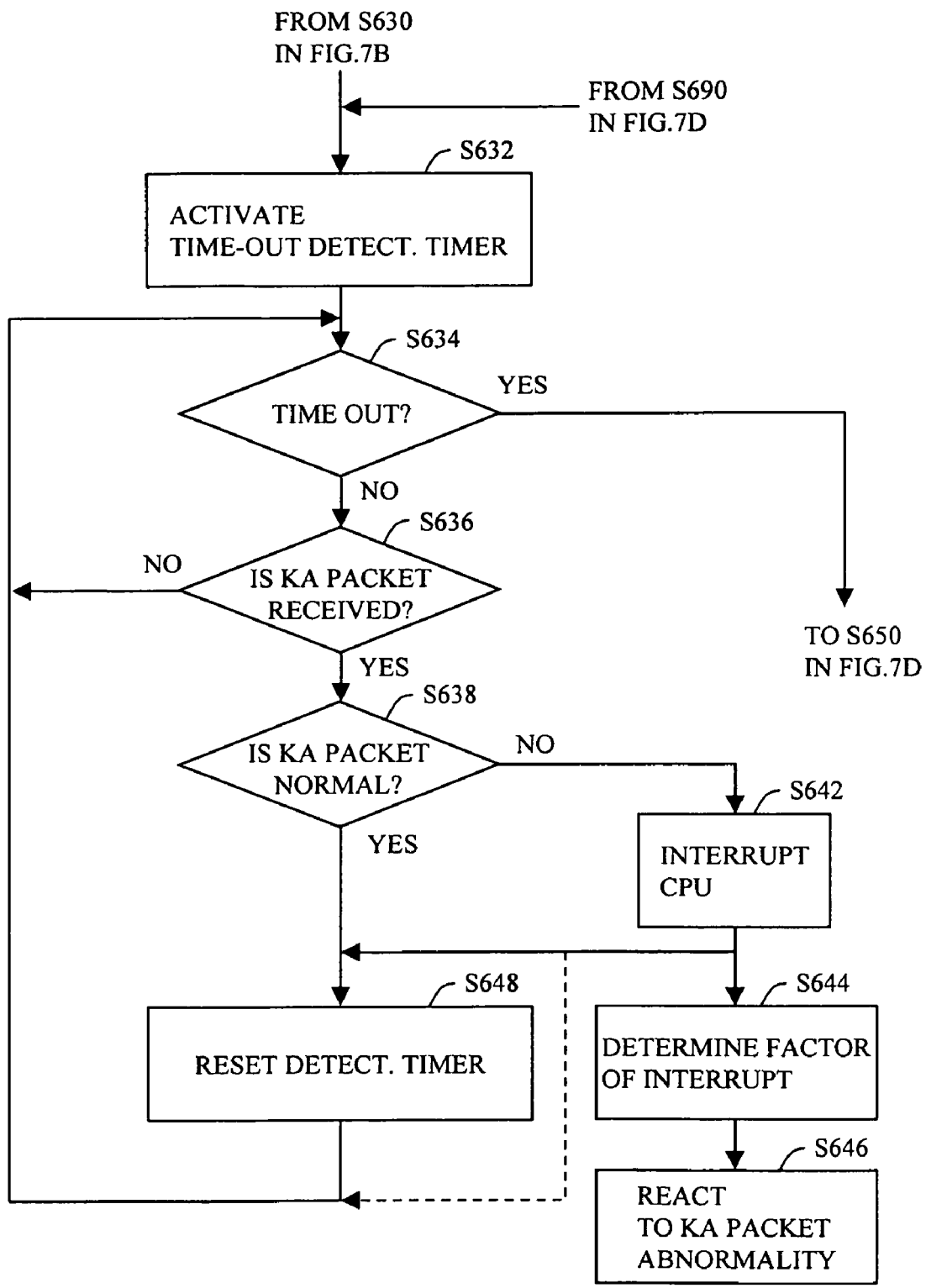
Figure 7D:
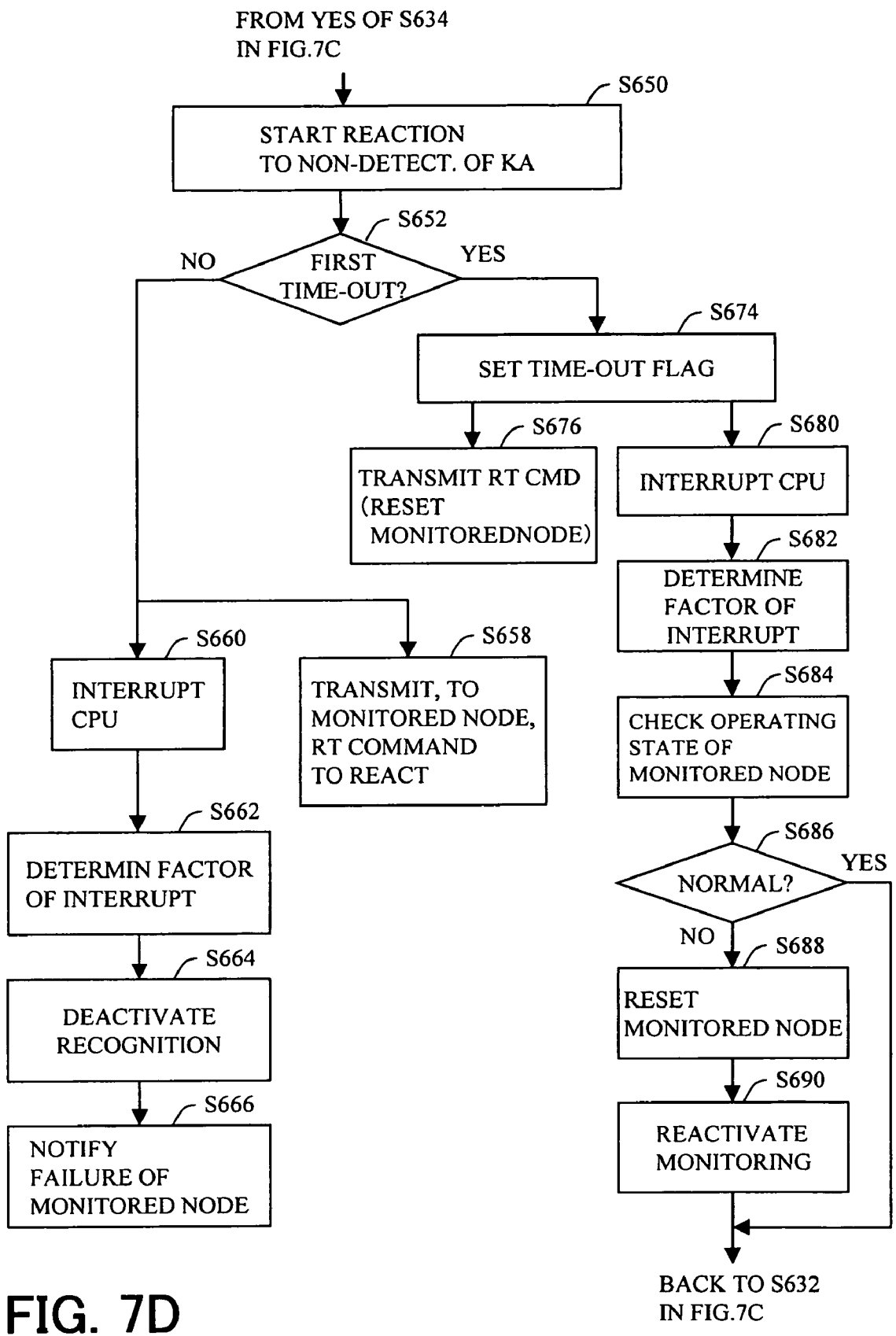

FIGS. 7B to 7D show a detailed flow chart of the node monitoring function of the monitoring node 200.

Referring to FIG. 7B, at Step 622, the application 250 transmits, to the manager node 500, an asynchronous command to reserve the isochronous transfer for the transmission of a keep-alive command for node monitoring.

At Step 624, the application 250 transmits, to the monitored node 300, an asynchronous command to set the conditions for the keep-alive command transmission by the Keep-Alive transmitter unit 314 of the monitored node 300. The conditions include the numbers of the respective isochronous channels to be used for the keep-alive command transmission, the transmission cycle period, parameter values in the keep-alive command packet, such as the code for checking the normality of the packet, the count in the packet sequence, and given specific data (e.g., module temperature), and the like.

At Step 626, the application 250 sets, to the monitoring setting unit 234, the check conditions to be used by the reception check unit 222. The check conditions include the numbers of the respective isochronous channels in which the keep-alive commands are to be received, a period of time for the receive time-out (or the number of cycles) for the keep-alive command, the check items of the keep-alive command packet, the reaction to the abnormality or non-detection of the keep-alive command packet, and the like. The reaction represents how to react to it, such as an interrupt to the CPU 102, the transmission of a real-time command packet to reset the utility function of the monitored node 300 or to disconnect the monitored node 300 from the bus, depending on the factors, such as the receive time-out for the keep-alive command and the data abnormality of the keep-alive command packet.

At Step 628, the application 250 transmits an asynchronous command to activate the operating-state check unit 322 and the Keep-Alive transmitter unit 314, to the monitored node 300. At Step 630, the application 250 activates the reception check unit 222 and the Keep-Alive receiver unit 214.

Referring to FIG. 7C, at Step 632, the reception check unit 222 activates a timer for detecting the receive time-out for the keep-alive command. At Step 634, the reception check unit 222 determines whether or not a receive time-out of the keep-alive command has occurred. If it is determined that a time-out has occurred, the procedure proceeds to Step 650 in FIG. 7D.

If it is determined at Step 634 that no time-out has occurred, the reception check unit 22 at Step 636 determines whether or not a keep-alive command packet has been received. If it is determined that no keep-alive command packet has been received, the procedure returns to Step 634. If it is determined at Step 636 that a keep-alive command packet has been received, the reception check unit 222 at Step 638 determines whether the received keep-alive command packet is normal or not. If it is determined that the keep-alive command packet is normal, the reception check unit 222 at Step 648 resets the detection timer. Then, the procedure returns to Step 634.

If it is determined at Step 638 that the keep-alive command packet is not normal, the reception check unit 222 at Step 642 interrupts the CPU (102 in FIG. 2A). Then, the procedure returns to Step 634 or proceeds to Step 648. On the other hand, the application 250 at Step 644 determines the factor or cause of the interrupt, and at Step 646 reacts to the packet abnormality.

Referring to FIG. 7D, at Step 650, the reception check unit 222 starts the reaction to the non-reception or non-detection of the keep-alive command packet to be received. At Step 652, the reception check unit 222 determines whether or not it is the first time-out in the immediately preceding predetermined period of time (e.g., four minutes). If it is determined that it is not the first time-out, the real-time command transmitter unit 216 at Step 658 transmits a real-time command for a reaction such as node disconnection to the monitored node 300, and then the reception check unit 222 at Step 660 interrupts the CPU (102 in FIG. 2A).

The application 250 at Step 662 determines the factor of the interrupt, and at Step 664 causes the recognition unit 232 to deactivate the recognition of the received data from the monitored node 300. At Step 666, the application 250 transmits a warning command indicative of a failure or break down of the monitored node 300 to the HMI computer node (ND2 in FIG. 5B).

If it is determined at Step 652 that it is the first time-out, the reception check unit 222 at Step 674 sets a time-out flag. At Step 676, in response to the time-out flag, the real-time command transmitter unit 216 transmits, to the monitored node 300, a real-time command for a reaction such as resetting the monitored node. At Step 680, the reception check unit 222 interrupts the CPU (102). The application 250 at Step 682 determines the factor of the interrupt. At Step 684, the application 250 checks whether the operating state of the monitored node 300 is normal or not.

If it is determined at Step 686 that the operating state of the monitored node 300 is normal, the procedure returns to Step 632 of FIG. 7C. If it is determined at Step 686 that the operating state of the monitored node 300 is not normal, the application 250 at Step 688 resets the utility function of the monitored node 300, such as the camera function. At Step 690, the application 250 reactivates the operation of the node monitoring function. Then, the procedure returns to Step 632 of FIG. 7C.

Figure 7E:
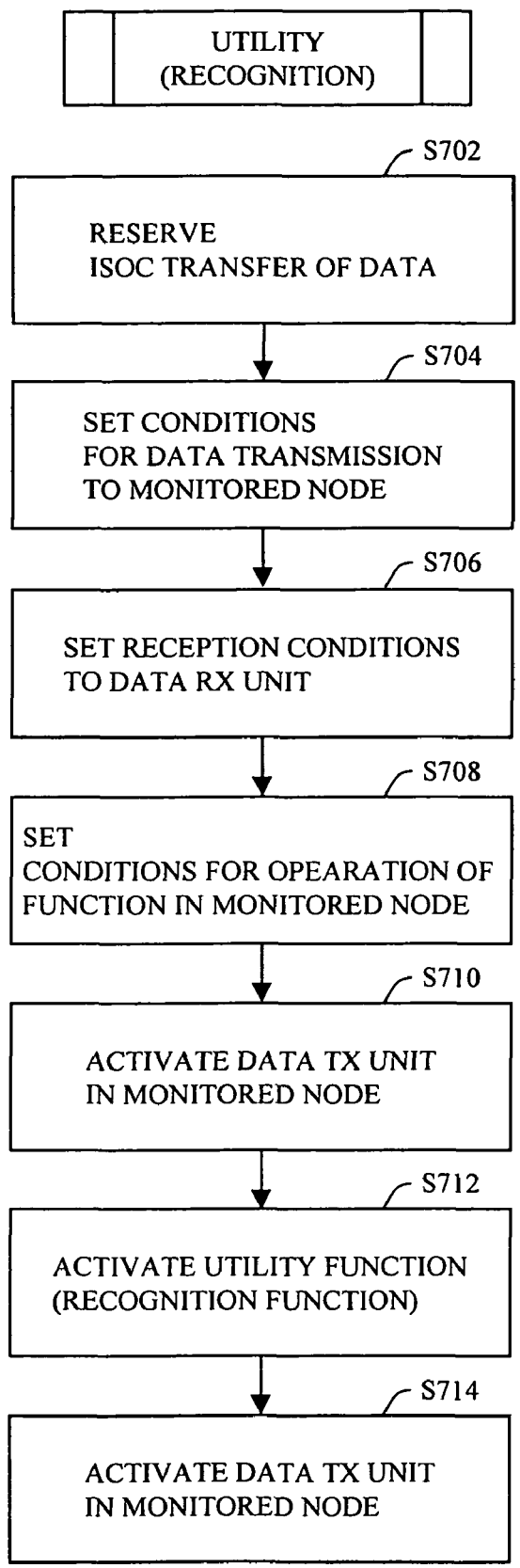
FIG. 7E shows a flow chart for the operation of the utility function in the monitoring node.

FIG. 7E shows a flow chart for the operation of the utility function, such as the image recognition, in the monitoring node 200.

Referring to FIG. 7E, at Step 702, the application 250 transmits an asynchronous command to reserve the isochronous transfer of utility data, such as image data, to the manager node 500.

At Step 704, the application 250 transmits, to the monitored node 300, an asynchronous command to set the utility data transmission conditions to the data transmitter unit 312. At Step 706, the application 250 sets the reception conditions to the data receiver unit 212. At Step 708, the application 250 transmits, to the monitored node 300, an asynchronous command to set the operating conditions of the utility function of the monitored node 300, for example, the camera function. At Step 710, the application 250 transmits an asynchronous command to activate the data transmitter unit 312 to the monitored node 300.

At Step 712, the application 250 activates the utility function of the monitoring node 200, such as the recognition unit 232. At Step 714, the application 350 transmits, to the monitored node 300, an asynchronous command to activate the data transmitter unit 312 of the monitored node 300.

Figure 8A:
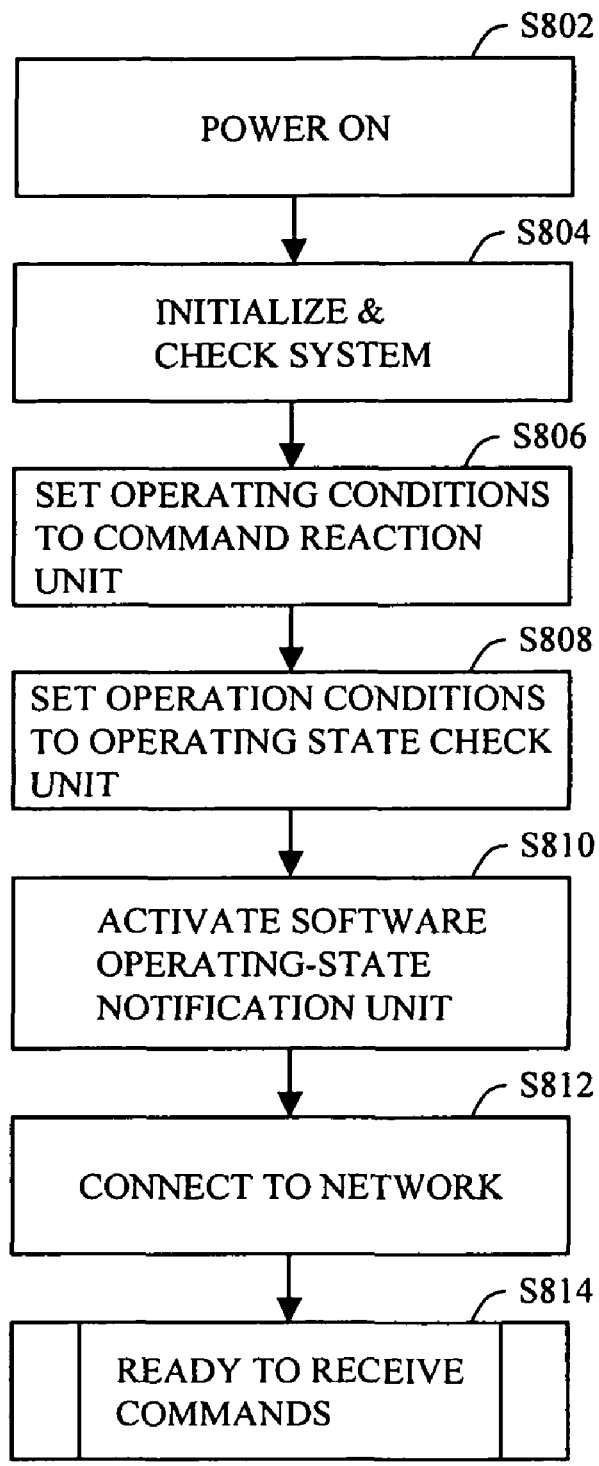
FIG. 8A shows a schematic flow chart for transmitting utility data and transmitting a keep-alive command, which is executed by the monitored node.

FIG. 8A shows a schematic flow chart for transmitting utility data and transmitting a keep-alive command, which is executed by the monitored node 300.

Referring to FIG. 8A, at Step 802, the power supply of the safety system 40 of FIG. 4A is turned on by, for example, the activation of the engine of the vehicle 30, so that the power supply of the monitored node 300 is turned on. At Step 804, the monitored node 300 initializes the operation of the monitored node 300, and checks the state of the system of the monitored node 300.

At Step 806, the application 350 sets the operating conditions of the command reaction unit 324 to it. At Step 808, the application 350 sets the conditions for checking the state to the operating-state check unit 322. At Step 810, the application 350 activates the software operating-state notification unit 324. At Step 812, the application 350 connects the IEEE 1394 hardware 32 of the monitored node 300 to the network 50. At Step 814, the application 350 and the real-time command receiver unit 316 enter into a state of being ready to receive an asynchronous command and a real-time command.

Figure 8B:
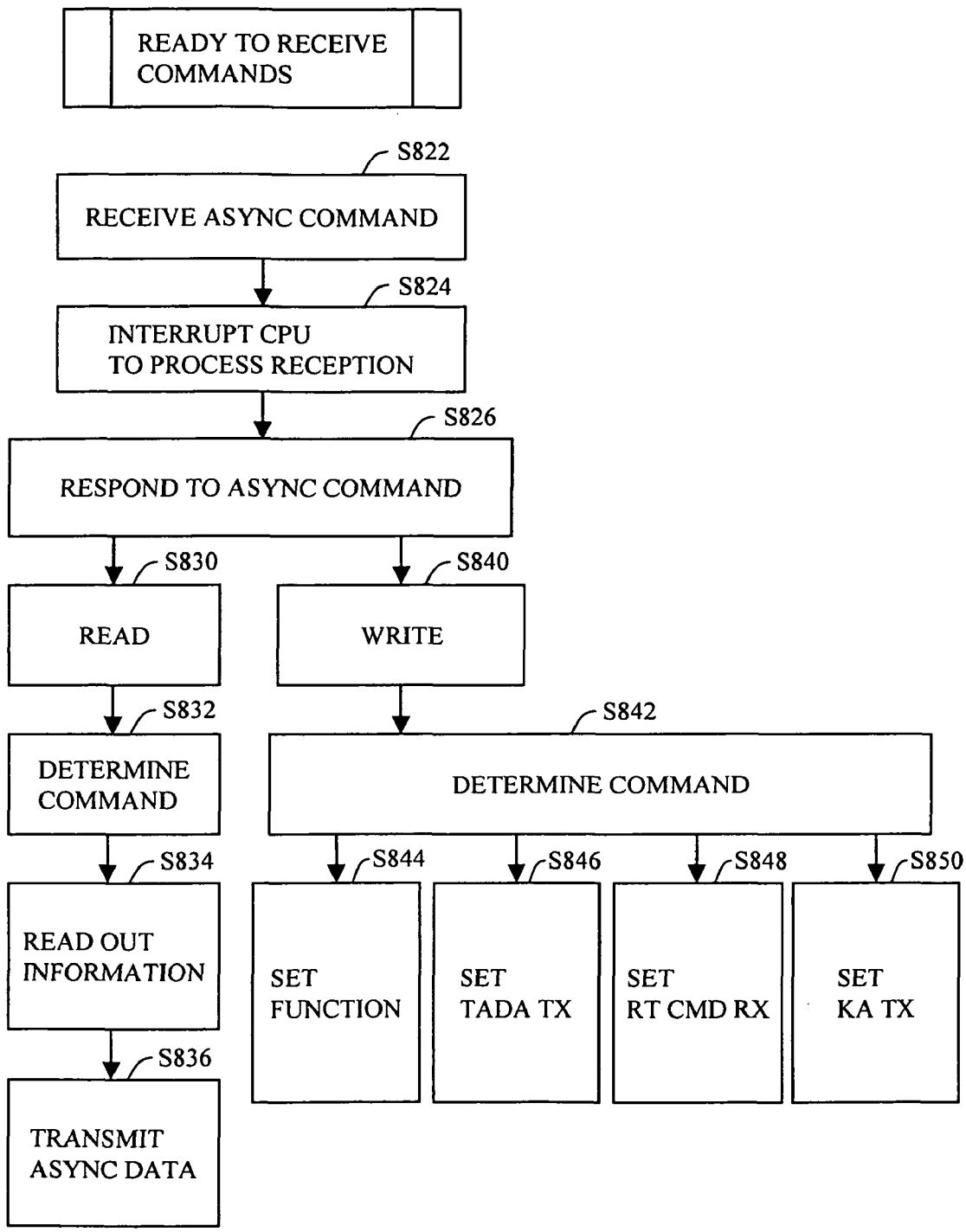
FIGS. 8B and 8C show respective detailed flow charts for, in response to a received command, transmitting utility data, transmitting a keep-alive command, and reacting to abnormality of a node state, which are executed by the monitored node.
Figure 8C:
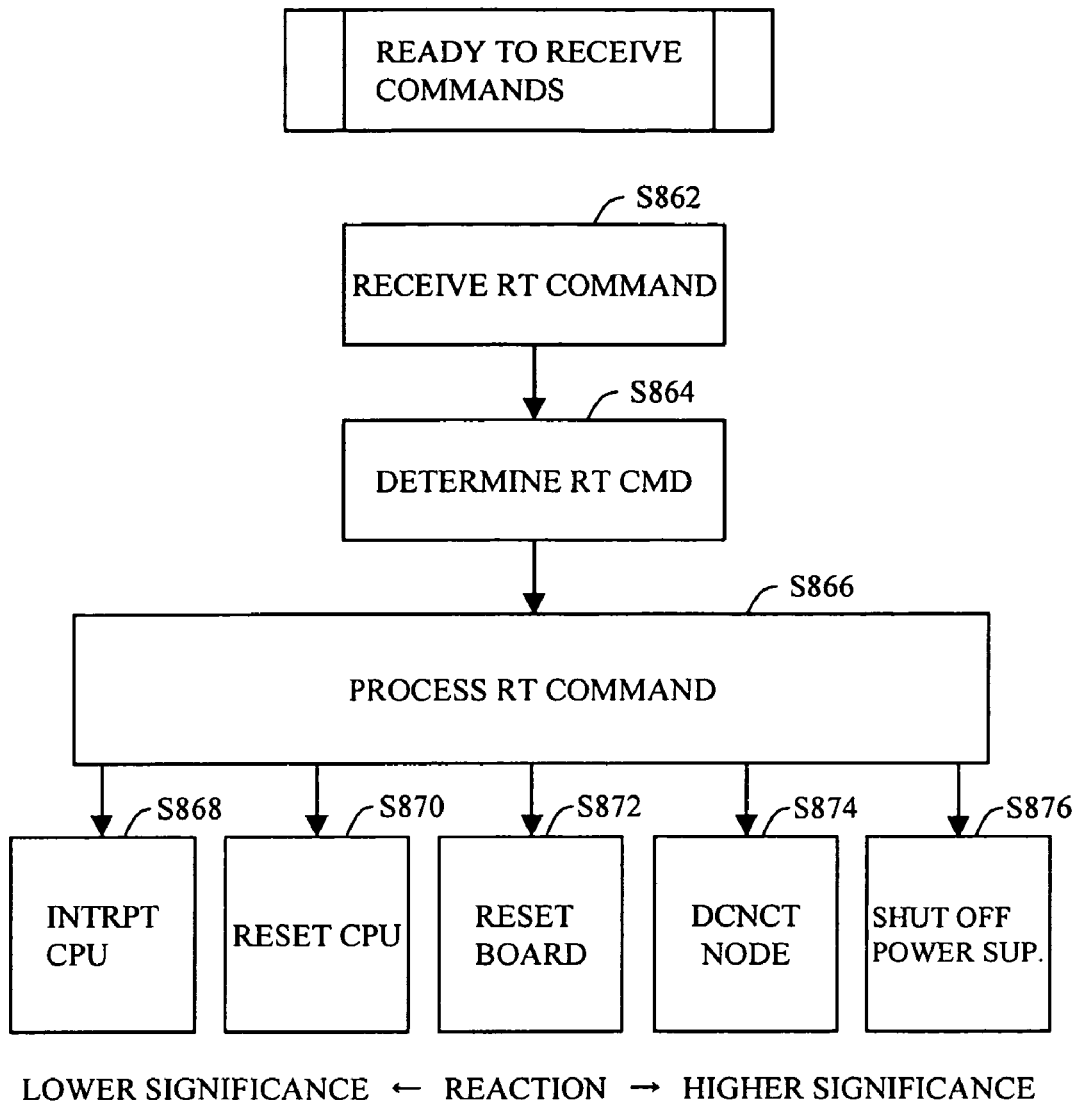

FIGS. 8B and 8C show respective detailed flow charts for, in response to a received command, transmitting utility data, transmitting a keep-alive command, and reacting to abnormality of a node state, which are executed by the monitored node 300.

Referring to FIG. 8B, the asynchronous transmitter and receiver unit 311 in the link (IF) layer of the monitored node 300 at Step 822 receives an asynchronous command over the network 50, and at Step 824 interrupts the CPU (102) to process the received asynchronous command. At Step 826, the application 350 transmits a response to the asynchronous command back to the monitoring node 200 over the network 50.

The application 350 at Step 830 starts to process a read request command, then at Step 832 determines the type of the read request command, then at Step 834 reads required information of the monitored node 300 in accordance with the command, and then at Step 836 transmits the information as asynchronous data.

The application 350 at Step 840 starts to process a write request command, and at Step 842 determines the type of the write request command. At Step 844, in accordance with the command, the application 350 sets the conditions for the utility function such as the camera module 352, for example, the format of the image data and the frame rate of the image data. At Step 846, the application 350 sets the conditions for the data transmitter unit 312, for example, the number of the isochronous channel to be used and the format of the transmission data. At Step 848, the application 350 sets the reception conditions to the real-time command receiver unit 316 to it, for example, the number of the isochronous channel to be used and the type of a command to wait to receive. At Step 850, the application 350 sets the transmission conditions to the Keep-Alive transmitter unit 314, for example, the number of the isochronous channel to be used, the transmission cycle period, the parameter value of the packet, and the start of transmission.

Referring to FIG. 8C, at Step S862, the real-time command receiver unit 316 of the monitored node 300 receives a real-time command over the network 50. At Step 864, the real-time command receiver unit 316 determines the type of the real-time command. At Step 866, the reaction unit 324 processes the real-time command in accordance with the resultant determination. At Step 868, the reaction unit 324 interrupts the CPU (102). At Step 870, the reaction unit 324 resets the CPU (102). At Step 872, the reaction unit 324 resets (RST) the circuit board. At Step 874, the reaction unit 324 disconnects (DCNT) the monitored node 300 from the network 50. At Step 876, the reaction unit 324 shuts off the power supply of the circuit board. A few ones of Steps 868 to 879 may occur simultaneously. In FIG. 8C, the significances of the respective reactions of Steps 868 to 870 decrease leftward and increase rightward.

Figure 9A:
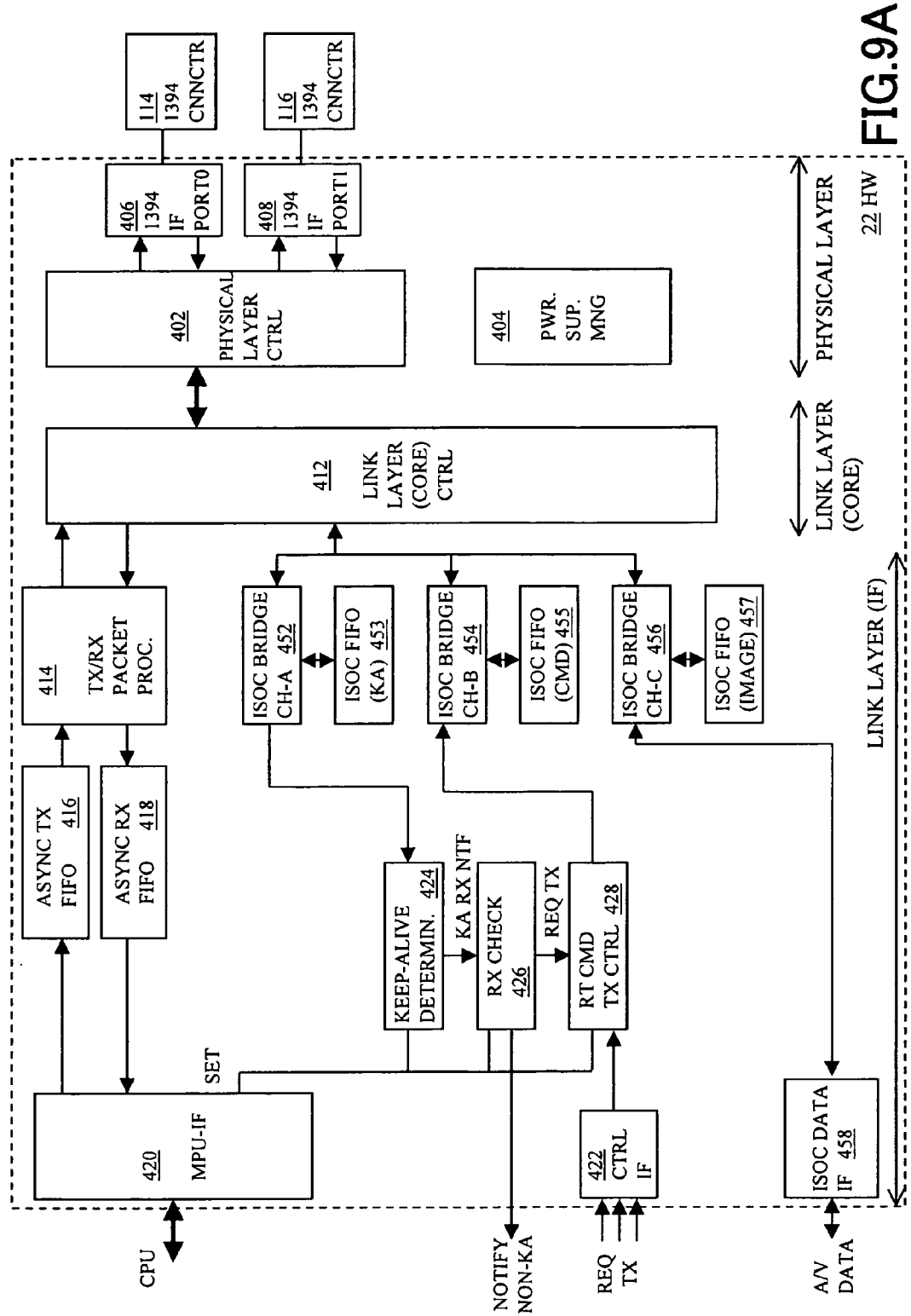
FIG. 9A shows an exemplary arrangement for LSI implementation of the hardware of the monitoring node, in accordance with the embodiment of the invention.

FIG. 9A shows an exemplary arrangement for LSI implementation of the hardware 22 of the monitoring node 200, in accordance with the embodiment of the invention. The hardware 22 has, in the physical layer, a physical layer control unit 402 which is connected to ports 406 and 408 connected to the respective connectors 114 and 116, and a power supply management unit 404. The hardware 22 has, in the link layer (core), a link layer (core) control unit 412 connected to the physical layer control unit 402. The hardware 22 has, in the link layer (IF) for each application function: a transmission/reception packet processor unit 414 connected to the link layer (core) control unit 412; an asynchronous transmission FIFO 416 and an asynchronous reception FIFO 418 connected to the transmission/reception packet processor unit 414; an MPU interface (IF) 420 connected to the FIFO's 418 and 416 and connected to the CPU; a channel isochronous bridge 456 connected to the link layer (core) control unit 412 and connected to an isochronous FIFO 457; and an isochronous data interface 458 connected to the isochronous bridge 456. The elements 402 to 420 and 456 to 458 are those in a conventional arrangement.

In this exemplary arrangement, the hardware 22 has, in the link layer (IF) for each application function, channel isochronous bridges 452 and 454 connected to the link layer (core) control unit 412 of the normal structure and connected to isochronous FIFO's 453 and 455. Further, the hardware 22 has, in the link layer (IF) for each application function, a Keep-Alive determiner unit 424, a reception check unit 426, and a real-time command transmitter unit 428. The Keep-Alive determiner unit 424 receives a keep-alive command from the isochronous bridge 452, determines the received keep-alive command, and provides a notification of the reception of the keep-alive command. In response to the notification of the reception of the keep-alive command from the Keep-Alive determiner unit 424, the reception check unit 426 checks the reception of the keep-alive command in accordance with predetermined conditions. The control interface (IF) 422 controls transmission in accordance with a transmission request from the software 24 or external hardware. The real-time command transmitter unit 428 transmits a real-time command to the isochronous bridge 454, in response to a transmission request by the reception check unit 426, a transmission control signal by the control interface (IF) 422, and a transmission request by the MPU interface (IF) 420.

The Keep-Alive determiner unit 424, the reception check unit 426, and the real-time command transmitter unit 428 are set by the application 250 of the software 24 via the MPU interface (IF) 420.

Figure 9B:
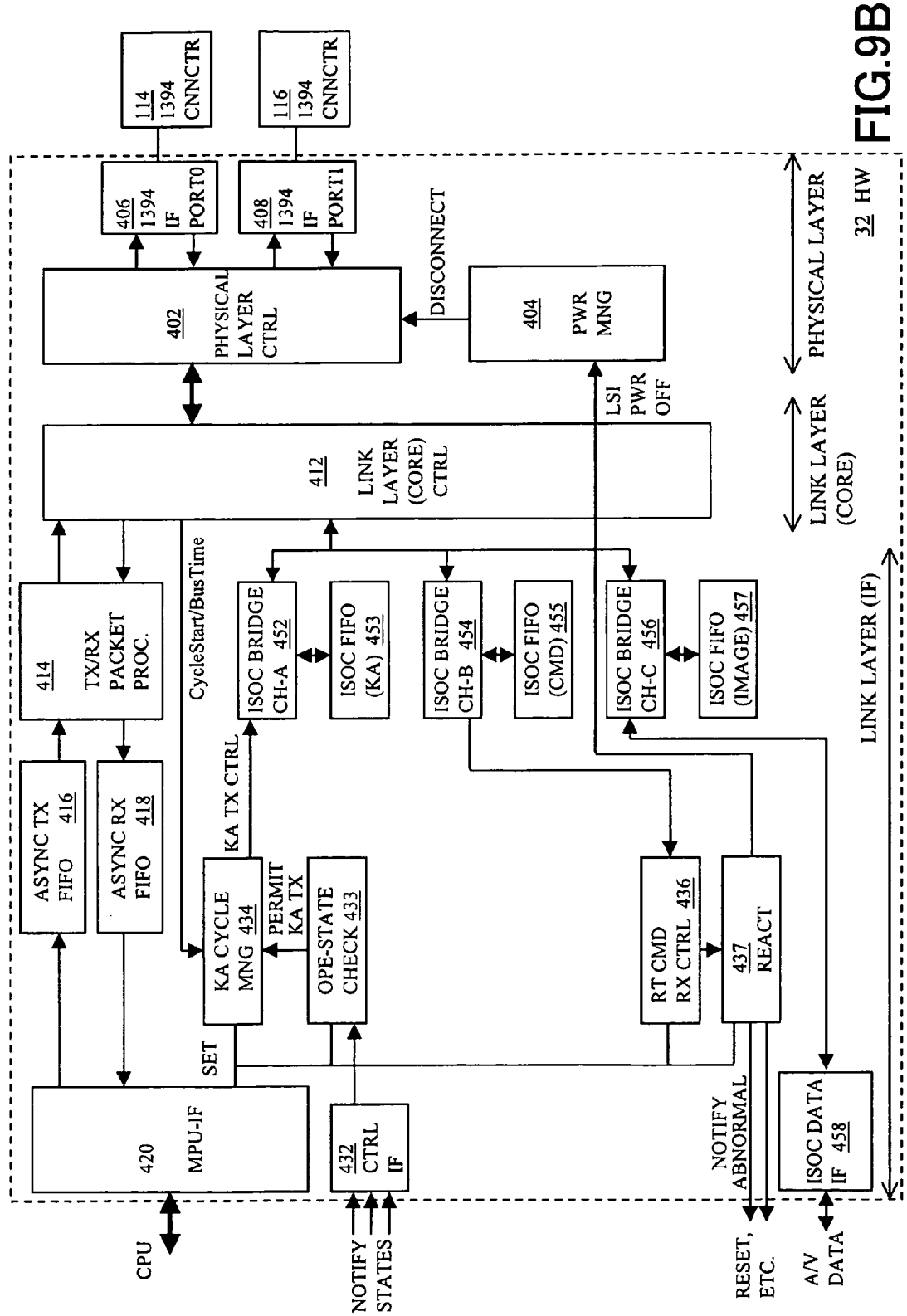
FIG. 9B shows an exemplary arrangement for LSI implementation of the hardware of the monitored node, in accordance with the embodiment of the invention.

FIG. 9B shows an exemplary arrangement for LSI implementation of the hardware 32 of the monitored node 300, in accordance with the embodiment of the invention. The elements 402 to 420 and 452 to 458 are similar to those of FIG. 9A.

In this exemplary arrangement, the hardware 32 further has a control interface (IF) 432, an operating-state check unit 433, a Keep-Alive transmission cycle management unit 434, a real-time command reception control unit 436, and a command reaction unit 437. The control interface (IF) 432 generates a value of the operating state of the utility function in accordance with the state notification from external hardware (e.g., the sensor 332, the state notification unit 354, and the like) and/or the software 34. The operating-state check unit 433 determines a normal operating state in accordance with the operating state value from the control interface (IF) 432 and/or the state notification from the software 34 via the MPU interface (IF), and issues permission to transmit a keep-alive command. The keep-alive transmission cycle management unit 434 manages the cycle of transmitting a keep-alive command in accordance with the cycle start and the bus time provided by the link layer (core) control unit 412, and transmits the keep-alive command via the isochronous bridge 452 in accordance with the peep-alive transmission permission from the operating-state check unit 433. The real-time command reception control unit 436 controls the reception of a real-time command, via the isochronous bridge 454. The command reaction unit 437 reacts to the command from the real-time command reception control unit 436 to thereby control resetting, abnormality information, power shut-off or the like.

The operating-state check unit 433, the Keep-Alive transmission cycle management unit 434, the real-time command reception control unit 436, and the command reaction unit 437 are set by the application of the software 34 via the MPU interface (IF) 420.

Figure 10:
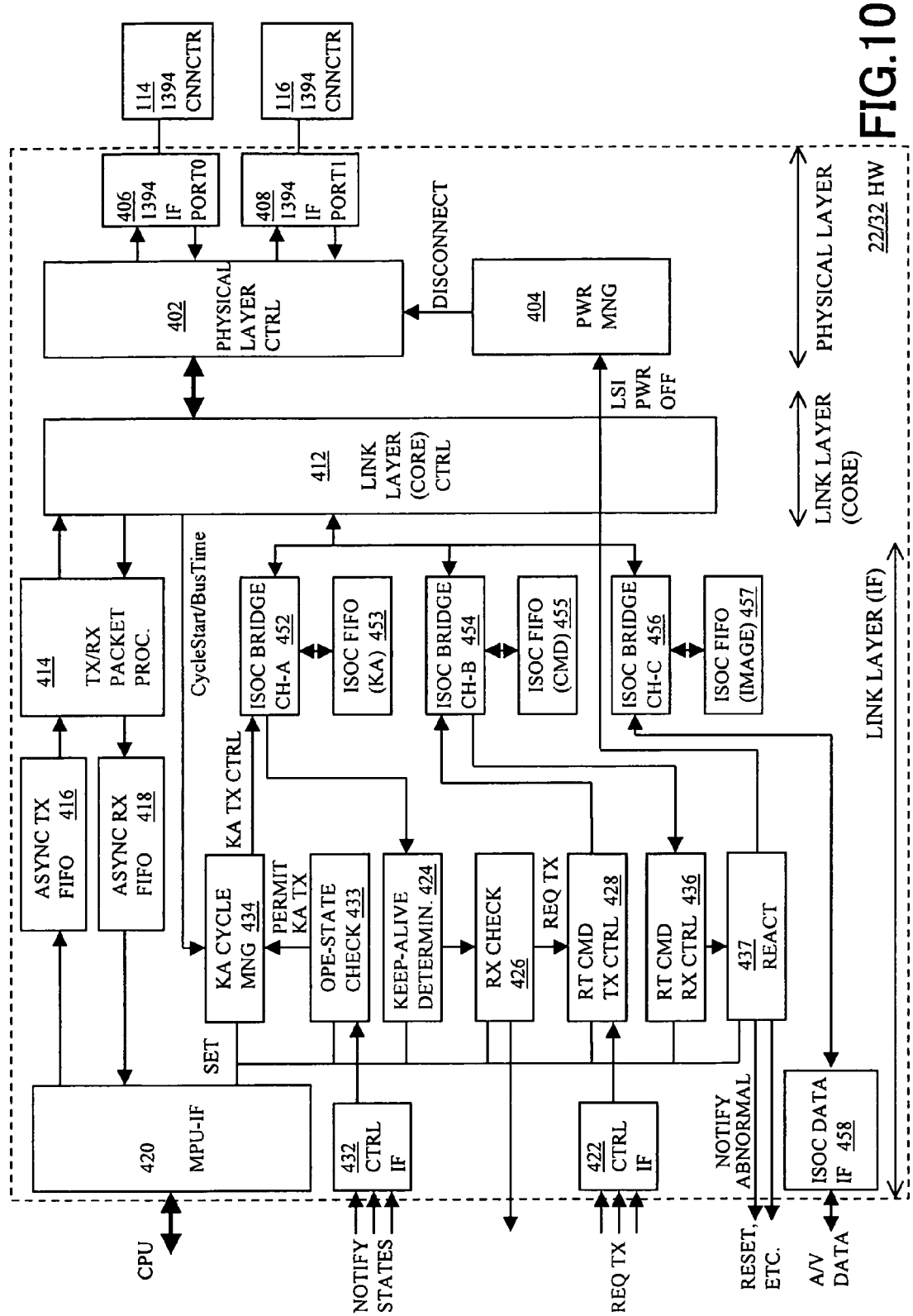
FIG. 10 shows an exemplary arrangement for the LSI implementation, including the elements of the exemplary arrangements of the hardware of FIG. 9A and the hardware of FIG. 9B.

FIG. 10 shows an exemplary arrangement for the LSI implementation, including the elements of the exemplary arrangements of the hardware 22 of FIG. 9A and the hardware 32 of FIG. 9B. The arrangement for the LSI implementation of FIG. 10 is applicable to both of the monitoring node 200 of FIG. 9A and the monitored node 300 of FIG. 9B.

Figure 11:
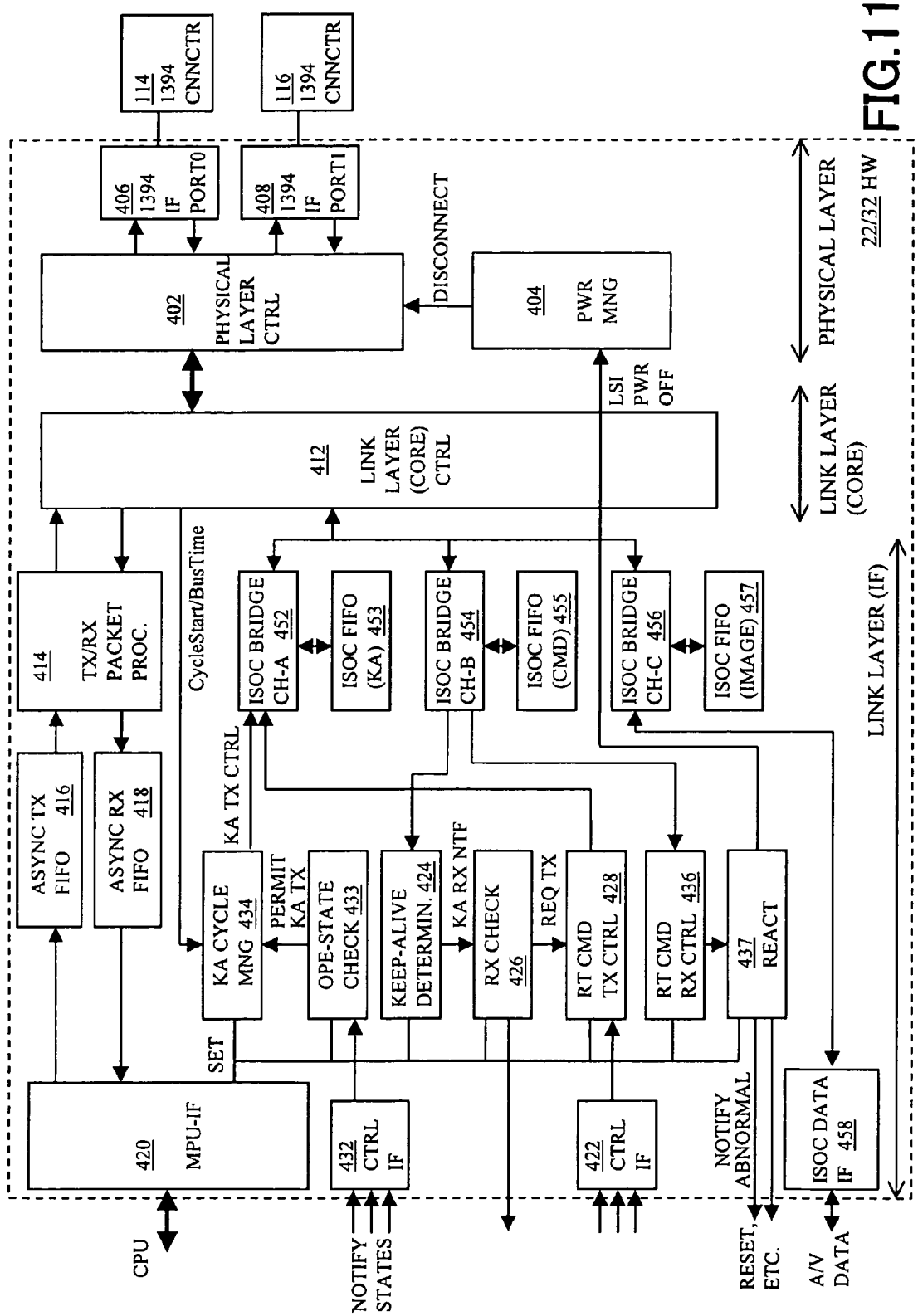
FIG. 11 shows another exemplary arrangement for the LSI implementation, including the elements of the hardware of FIG. 10.

FIG. 11 is a modification of the exemplary arrangement of FIG. 10, and shows another exemplary arrangement for the LSI implementation, including the elements of the hardware 22/32 of FIG. 10. In this exemplary arrangement, the Keep- Alive determiner unit 424 receives a keep-alive command via the isochronous bridge 454, determines the received keep-alive command, and notifies the reception check unit 426 of the reception of the keep-alive command. The real-time command transmitter unit 428 transmits a real-time command via the isochronous bridge 452, in response to a transmission request from the reception check unit 426, a transmission control signal from the control interface (IF) 422, and a transmission request from the MPU interface (IF) 420. The arrangement for the LSI implementation of FIG. 11 is applicable to both of the monitoring node 200 of FIG. 9A and the monitored node 300 of FIG. 9B.

FIG. 12A shows another exemplary arrangement for LSI implementation of the hardware 22 of the monitoring node 200, in accordance with the embodiment of the invention. In this exemplary arrangement, the Keep-Alive determiner unit 424 receives a keep-alive command from at least one of the isochronous bridges 452, 454 and 456, determines the received keep-alive command, and notifies the reception check unit 426 of the reception of the keep-alive command. The real-time command transmitter unit 428 transmits a real-time command via any of the isochronous bridges 452, 454 and 546, in response to a transmission request from the reception check unit 426 and a transmission control signal from the control interface (IF) 422. In this exemplary arrangement, isochronous data interfaces 472, 473 and 474 are connected to the isochronous bridges 452, 454 and 456 via a selector 170. The other portion of the exemplary arrangement of FIG. 12A is similar to that of FIG. 9A.

Figure 12B:
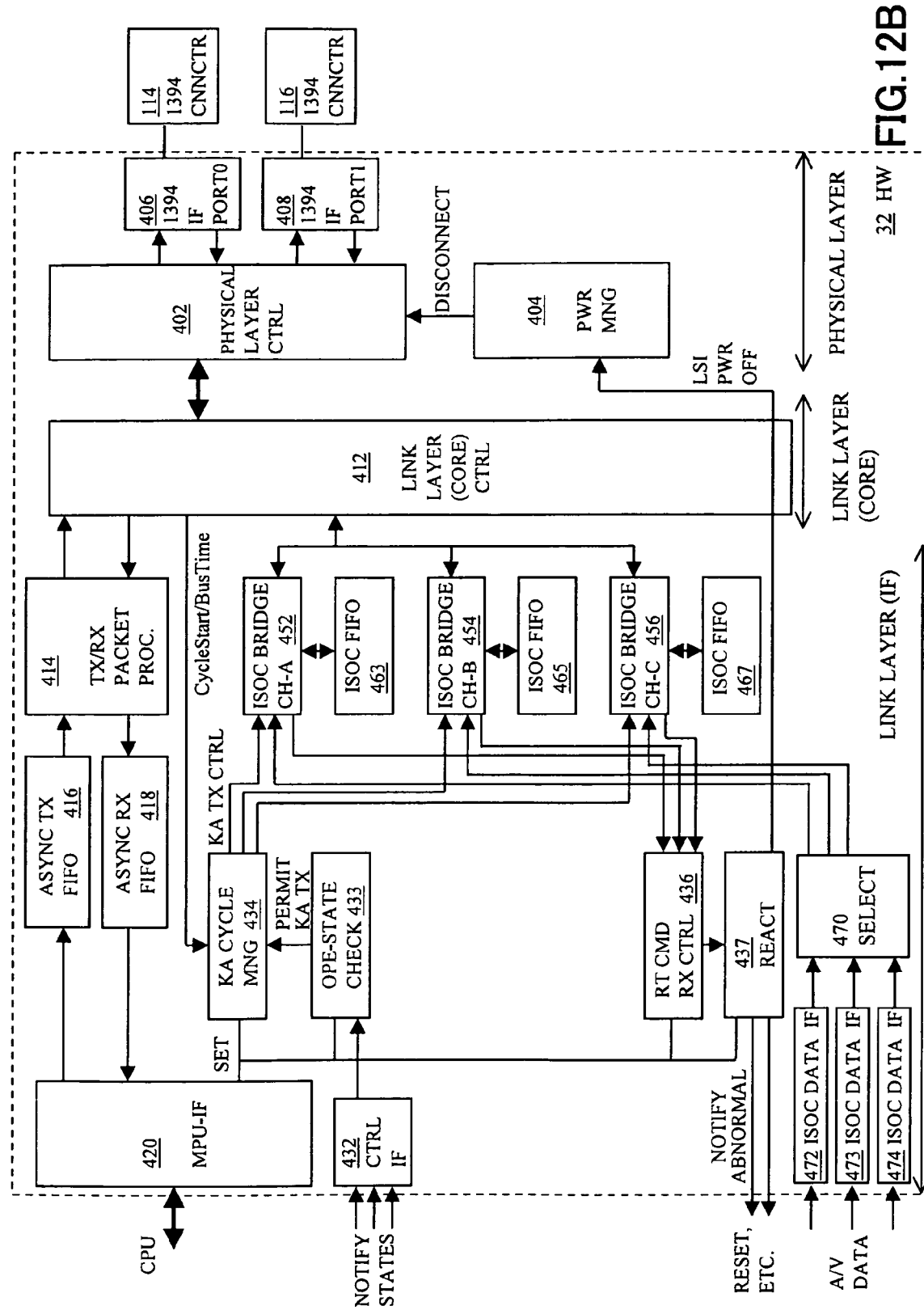
FIG. 12B shows another exemplary arrangement for LSI implementation of the hardware of the monitored node, in accordance with the embodiment of the invention.

FIG. 12B shows another exemplary arrangement for LSI implementation of the hardware 32 of the monitored node 300, in accordance with the embodiment of the invention. In this exemplary arrangement, the Keep-Alive transmission cycle management unit 434 manages the transmission cycle of the keep-alive command in accordance with the cycle start and the bus time from the link layer (core) control unit 412, and transmits the keep-alive command via any of the isochronous bridges 452, 454 and 456, in accordance with the Keep-Alive transmission permission from the operating-state check unit 433. The real-time command reception control unit 436 controls the reception of the real-time command via any of the isochronous bridges 452, 454 and 456. In this exemplary arrangement, the isochronous data interfaces 472, 473 and 474 are connected to the isochronous bridges 452, 454 and 456 via the selector 170. The other portion of the exemplary arrangement of FIG. 12B is similar to that of FIG. 9B.

Figure 13:
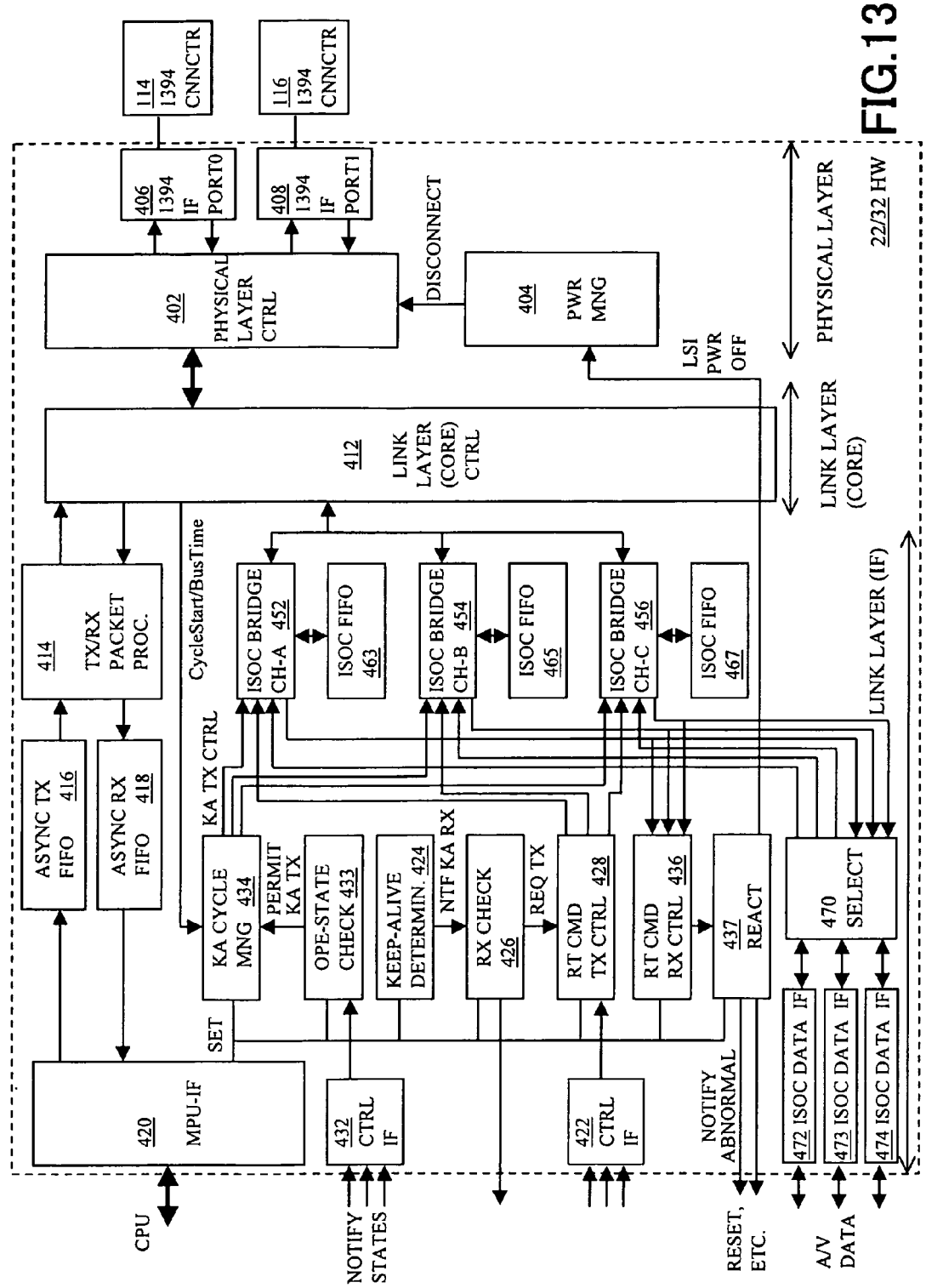
FIG. 13 shows a further exemplary arrangement for the LSI implementation, including the elements of the exemplary arrangements of the hardware of FIG. 12A and the hardware of FIG. 12B.

FIG. 13 shows a further exemplary arrangement for the LSI implementation, including the elements of the exemplary arrangements of the hardware 22 of FIG. 12A and the hardware 32 of FIG. 12B. The arrangement for the LSI implementation of FIG. 13 is applicable to both of the monitoring node 200 of FIG. 12A and the monitored node 300 of FIG. 12B.

Figure 14A:
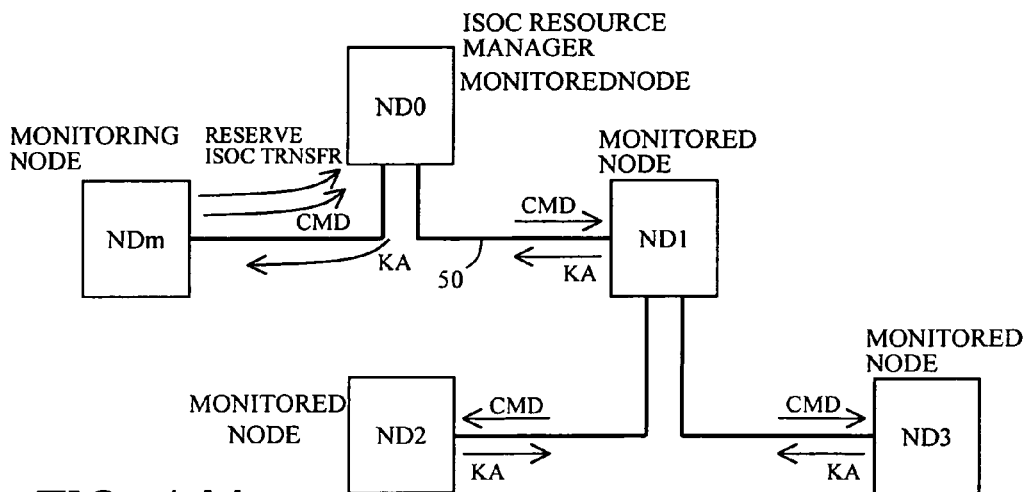
FIG. 14A shows the arrangement of the monitoring node and the monitored nodes connected to the IEEE 1394 network, in accordance with another embodiment of the invention.
Figure 14B:
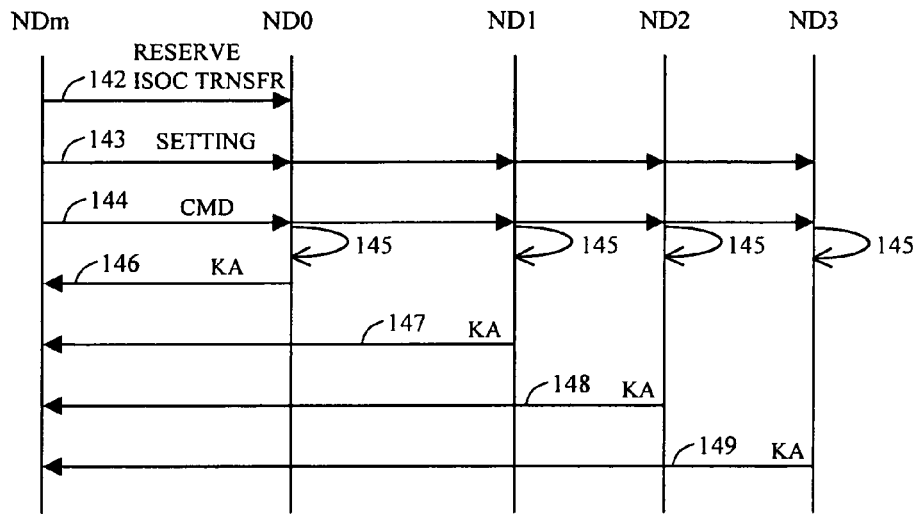
FIG. 14B shows the procedure of communication between the monitoring node and the plurality of monitored nodes.
Figure 14C:
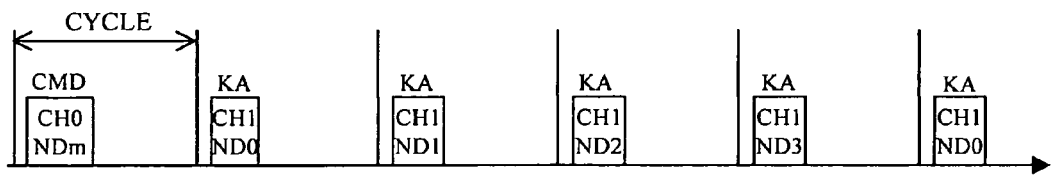
FIG. 14C shows a time chart of the keep-alive command cyclically transferred from the monitored nodes to the monitoring node in the same channel.

FIG. 14A shows the arrangement of the monitoring node NDm and the monitored nodes ND0, ND1, ND2 and ND3 connected to the IEEE 1394 network 50, in accordance with another embodiment of the invention. FIG. 14B shows the procedure of communication between the monitoring node NDm and the plurality of monitored nodes ND0 to ND3. FIG. 14C shows a time chart of the keep-alive command cyclically transferred from the monitored nodes ND0, ND1, ND2 and ND3 to the monitoring node NDm in the same channel CH1. In this case, the monitored node ND0 serves as the isochronous resource manager.

Referring to FIGS. 14A to 14C, at Step 142, the application 250 of the monitoring node NDm transmits, to the monitored node ND1 as the isochronous resource manager, an asynchronous request command to reserve the transfer in the isochronous channel 1. At Step 143, the application 350 of the monitoring node NDm transmits, to the monitored nodes ND0 to ND3, an asynchronous command to set the transmission conditions to the Keep-Alive transmitters 314 of the monitored nodes ND0 to ND3. The transmission conditions include the channel to be used (e.g., CH1), the order of permitting transmissions, the keep-alive transmission cycle period of each node (e.g., four cycles), and the request for waiting for a trigger for starting transmission. The Keep-Alive transmitters 314 of the monitored nodes ND0 to ND3 wait for the reception of the trigger for starting transmission.

At Step 144, the monitoring node NDm broadcasts, to the monitored nodes ND0 to ND3, an asynchronous command to request the start of channel shared transmission. The command may be transmitted in the reserved isochronous channel (e.g., CH0 or CH1). When the command is transferred in an isochronous channel (CH0) other than the isochronous channel (e.g., CH1) for transmitting a keep-alive command, also the monitoring node NDm at Step 142 reserves the other isochronous channel.

At Step 145, the Keep-Alive transmitters 314 of the monitored nodes ND0 to ND3 start to transmit the keep-alive command, in accordance with the command to start channel shared transmission. At Step 146, the Keep-Alive transmitter unit 314 of the monitored node ND0 transmits the keep-alive command (KA) to the monitoring node NDm in the isochronous channel (CH1) in the first cycle. At Step 147, the Keep-Alive transmitter unit 314 of the monitored node ND1 transmits the keep-alive command to the monitoring node NDm in the isochronous channel (CH1) in the second cycle. At Step 148, the Keep-Alive transmitter unit 314 of the monitored node ND2 transmits the keep-alive command to the monitoring node NDm in the isochronous channel (CH1) in the third cycle. At Step 149, the Keep-Alive transmitter unit 314 of the monitored node ND3 transmits the keep-alive command in the isochronous channel (CH1) in the fourth cycle. In this manner, the keep-alive command is cyclically transmitted from the monitored nodes ND0 to ND3 to the monitoring node NDm.

Figure 15:
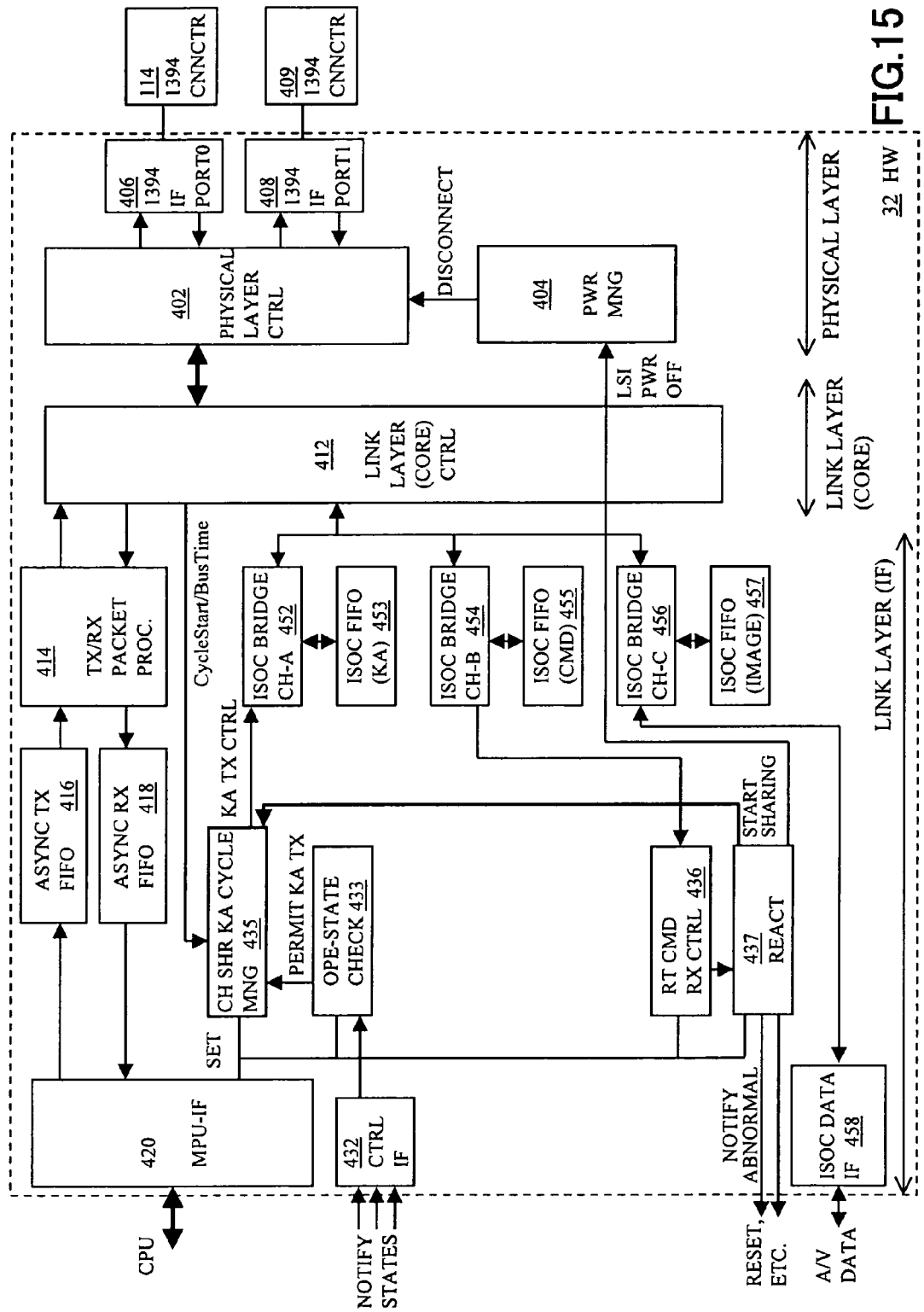
FIG. 15 shows another exemplary arrangement for LSI implementation of the hardware of the monitored node used in the embodiment of FIGS. 14A to 14C.

FIG. 15 shows another exemplary arrangement for LSI implementation of the hardware 32 of the monitored node 300 used in the embodiment of FIGS. 14A to 14C. In this exemplary arrangement, a channel shared keep-alive transmission cycle management unit 435 is used instead of the keep-alive transmission cycle management unit 434 of FIG. 9A. The channel shared keep-alive transmission cycle management unit 435 manages the keep-alive command transmission cycle period in accordance with the cycle start and the bus time from the link layer (core) control unit 412, manages the isochronous channel sharing cycle of the transmission conditions received from the monitoring node NDm, and transmits the keep-alive command via the isochronous bridge 452 according to the keep-alive transmission permission from the operating-state check unit 433. The command reaction unit 437 notifies the channel shared keep-alive transmission cycle management unit 435 of the reception of a request for starting channel shared transmission, in response to a real-time command to request the start of the channel shared transmission, which command is received from the real-time command reception control unit 436. The other portion of the exemplary arrangement of FIG. 15 is similar to that of FIG. 9A.

Figure 16:
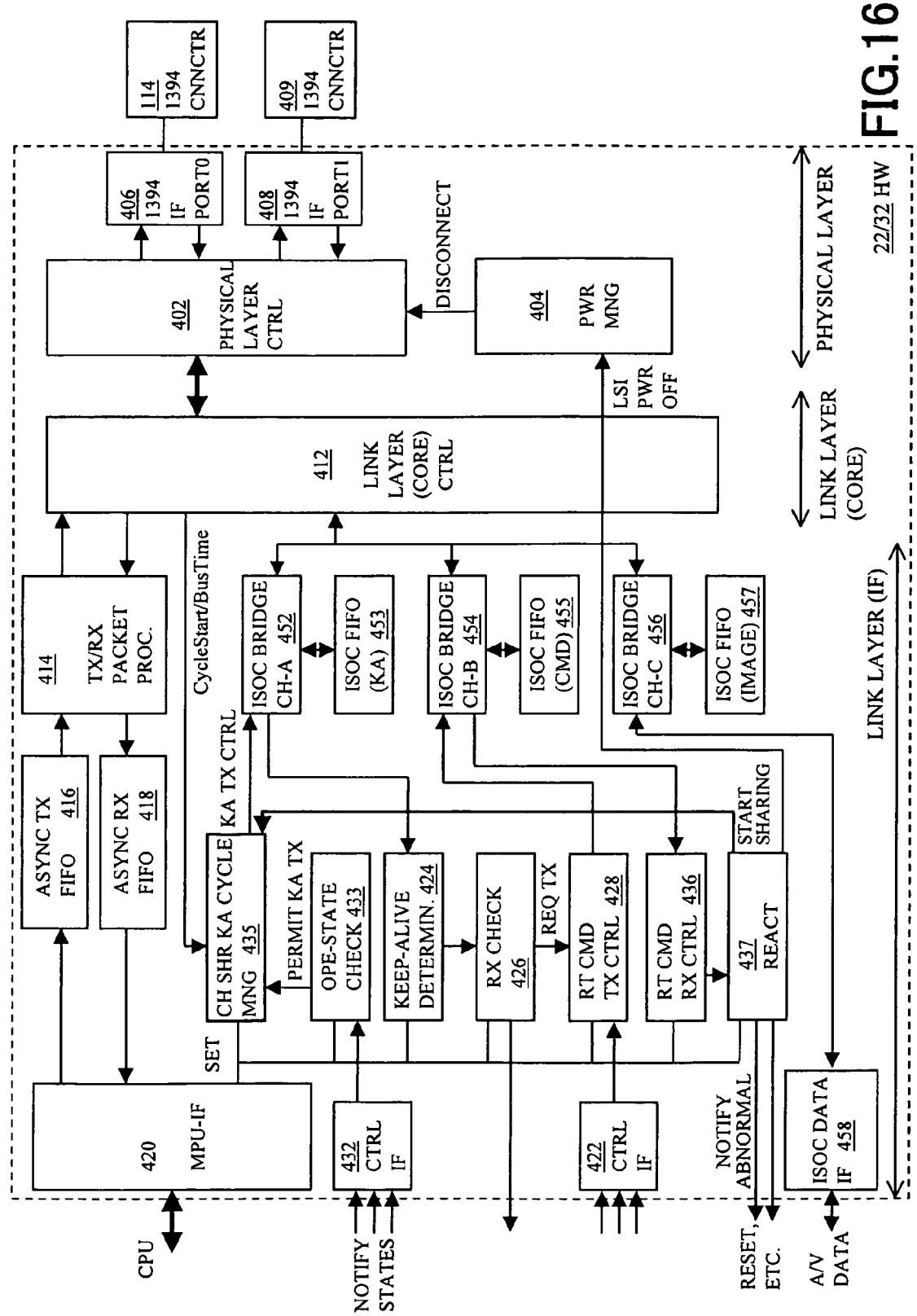
FIG. 16 shows an exemplary arrangement for the LSI implementation, including the elements of the exemplary arrangements of the hardware of FIG. 9A and the hardware of FIG. 15.

FIG. 16 shows an exemplary arrangement for the LSI implementation, including the elements of the exemplary arrangements of the hardware 22 of FIG. 9A and the hardware 32 of FIG. 15. The arrangement for LSI implementation of FIG. 16 is applicable to both of the monitoring node 200 of FIG. 9A and the monitored node 300 of FIG. 15.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A network system comprising:
   a monitored node which is connected to a network for isochronous transfer and asynchronous transfer and has a utility function;
   a monitoring node which monitors an operating state of the monitored node; and
   a further node which is different from the monitored node and the monitoring node and provides a cycle start packet to the network, wherein
      the monitored node cyclically transmits a command representative of a normal operating state thereof to the monitoring node in one of isochronous channels in a time cycle of the network that differs from an isochronous channel used for the utility function in the time cycle, and
      when the monitoring node determines non-reception of the command representative of the normal operating state from the monitored node, the monitoring node transmits, to the monitored node, a real-time command to execute abnormality response processing, in one of the isochronous channels, and
   the monitored node executes the abnormality response processing in response to reception of the real-time command.

2. The network system according to claim 1, wherein the monitored node comprises a reaction unit which resets operation of the monitored node in response to reception of the real-time command.

3. A network system comprising:
   a monitored node which is connected to a network for isochronous transfer and asynchronous transfer and has a utility function;
   a monitoring node which monitors an operating state of the monitored node; and
   a further node which is different from the monitored node and the monitoring node and provides a cycle start packet to the network, wherein
      the monitored node cyclically transmits a command representative of a normal operating state thereof to the monitoring node in one of isochronous channels in a time cycle of the network that differs from an isochronous channel used for the utility function in the time cycle, and
      when the monitoring node determines non-reception of the command representative of the normal operating state from the monitored node, the monitoring node transmits, to the monitored node, a real-time command to execute abnormality response processing, in one of the isochronous channels.

4. The network system according to claim 3, wherein the command representative of the normal operating state is a keep-alive command.

5. The network system according to claim 4, wherein the isochronous channel used for transmitting the command representative of the normal operating state is different from one of the isochronous channels used for transmitting the real-time command.

6. The network system according to claim 3, wherein the isochronous channel used for transmitting the command representative of the normal operating state is different from one of the isochronous channels used for transmitting the real-time command.

7. The network system according to claim 6, wherein the monitored node causes a data generator to generate data, and transmits the generated data in one of the isochronous channels on the network.

8. The network system according to claim 6, wherein the network system forms a safety system for a vehicle, and a malfunction of the safety system is prevented by the real-time command.

9. The network system according to claim 6, wherein the monitoring node comprises: a receiver which receives the command representative of the normal operating state of the monitored node; a determiner which determines reception of the command; and a command transmitter which transmits the real-time command to the monitored node when the determiner determines that the command representative of the normal operating state has not been received from the monitored node.

10. The network system according to claim 6, wherein the monitored node comprises: a transmitter which cyclically transmits the command representative of the normal operating state in accordance with an operating state of the utility function of the monitored node; and a reaction unit which executes the abnormality response processing in response to the real-time command when the real-time command is received.

11. The network system according to claim 3, wherein the monitored node causes a data generator to generate data, and transmits the generated data in one of the isochronous channels on the network.

12. The network system according to claim 3, wherein the network system forms a safety system for a vehicle, and a malfunction of the safety system is prevented by the real-time command.

13. The network system according to claim 3, wherein the monitoring node comprises: a receiver which receives the command representative of the normal operating state of the monitored node; a determiner which determines reception of the command; and a command transmitter which transmits the real-time command to the monitored node when the determiner determines that the command representative of the normal operating state has not been received from the monitored node.

14. The network system according to claim 3, wherein the monitored node comprises: a transmitter which cyclically transmits the command representative of the normal operating state in accordance with an operating state of the utility function of the monitored node; and a reaction unit which executes the abnormality response processing in response to the real-time command when the real-time command is received.

15. The network system according to claim 3, wherein the monitored node comprises a reaction unit which resets operation of the monitored node in response to reception of the real-time command.

16. A network system comprising:
   a plurality of monitored nodes which are connected to a network for isochronous transfer and asynchronous transfer;
   a monitoring node which monitors operating states of the plurality of respective monitored nodes; and a further node which is different from the monitored nodes and the monitoring node and provides a cycle start packet to the network, wherein each of the plurality of monitored nodes cyclically transmits a command representative of a normal operating state of that monitored node to the monitoring node in one of isochronous channels in a time cycle of the network that differs from an isochronous channel used for a utility function in the time cycle, when the monitoring node determines non-reception of the command representative of the normal operating state from one of the plurality of monitored nodes, the monitoring node transmits, to the one monitored node, a real-time command to execute abnormality response processing, in one of the isochronous channels, and at least one of the monitored nodes executes the abnormality response processing in response to reception of the real-time command.

17. The network system according to claim 16, wherein the plurality of monitored nodes transmit the respective commands representative of the respective normal operating states of the respective monitored nodes in one of isochronous channels on the network in respective different cycles.

18. The network system according to claim 16, wherein the monitored node comprises a reaction unit which resets operation of the monitored node in response to reception of the real-time command.

* * * * *